P. MONTSABRÉ.
ENDLESS TRACKS MOUNTED ON WHEELED CARRIERS.
APPLICATION FILED DEC. 5, 1910.
1,017,443.
Patented Feb. 13, 1912.
18 SHEETS—SHEET 2.
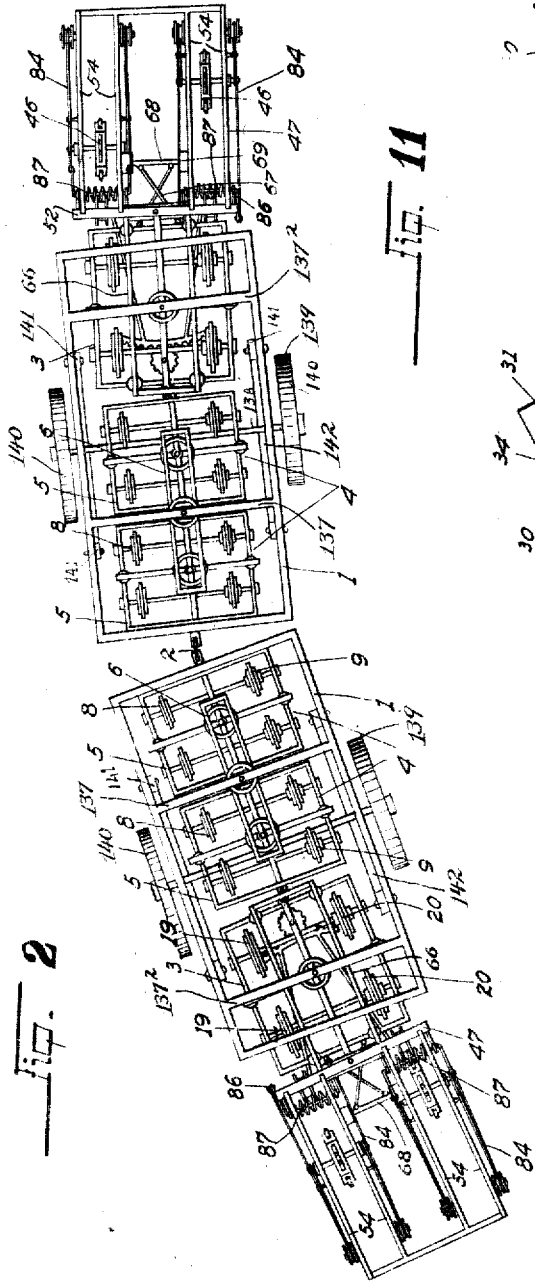
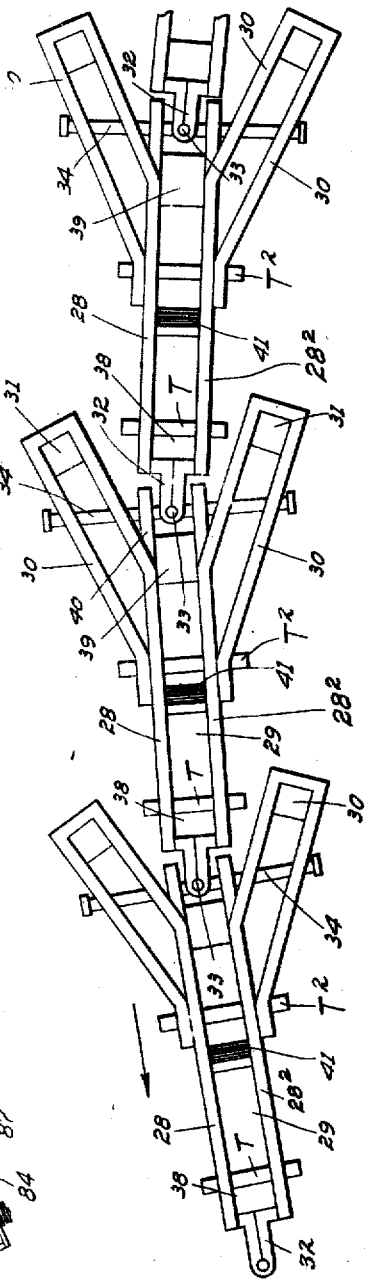
Inventor
Philippe Montsabré

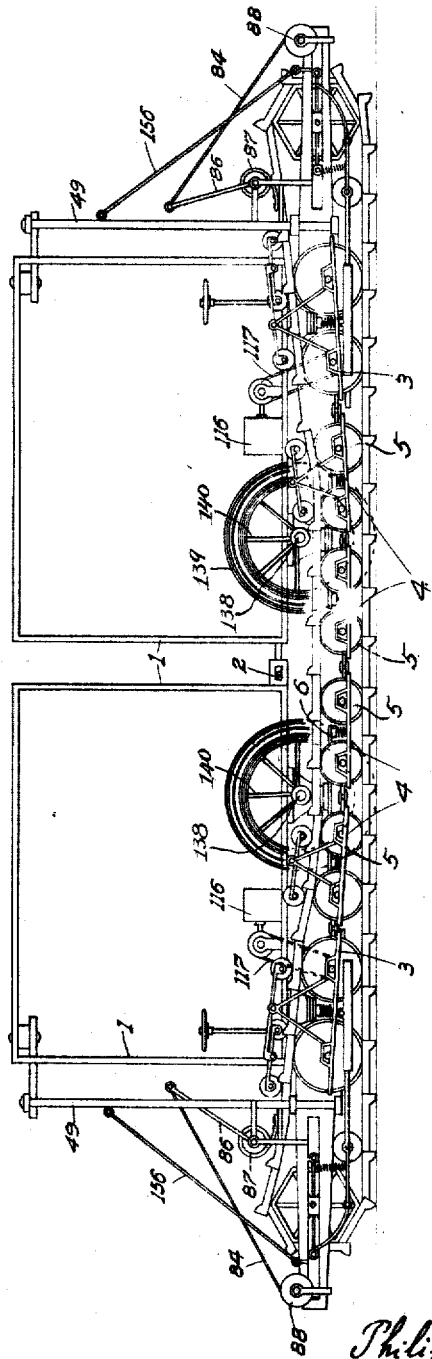

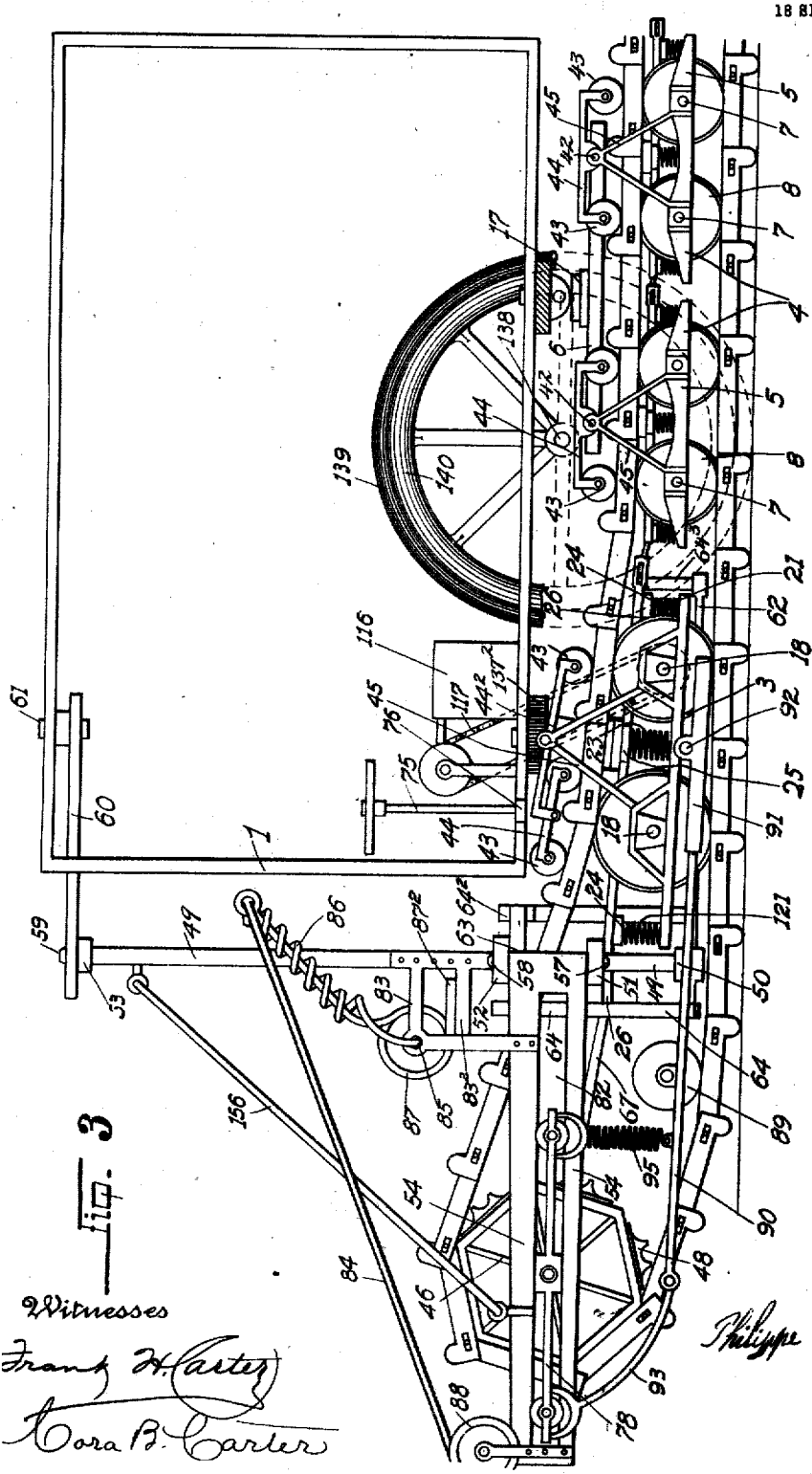

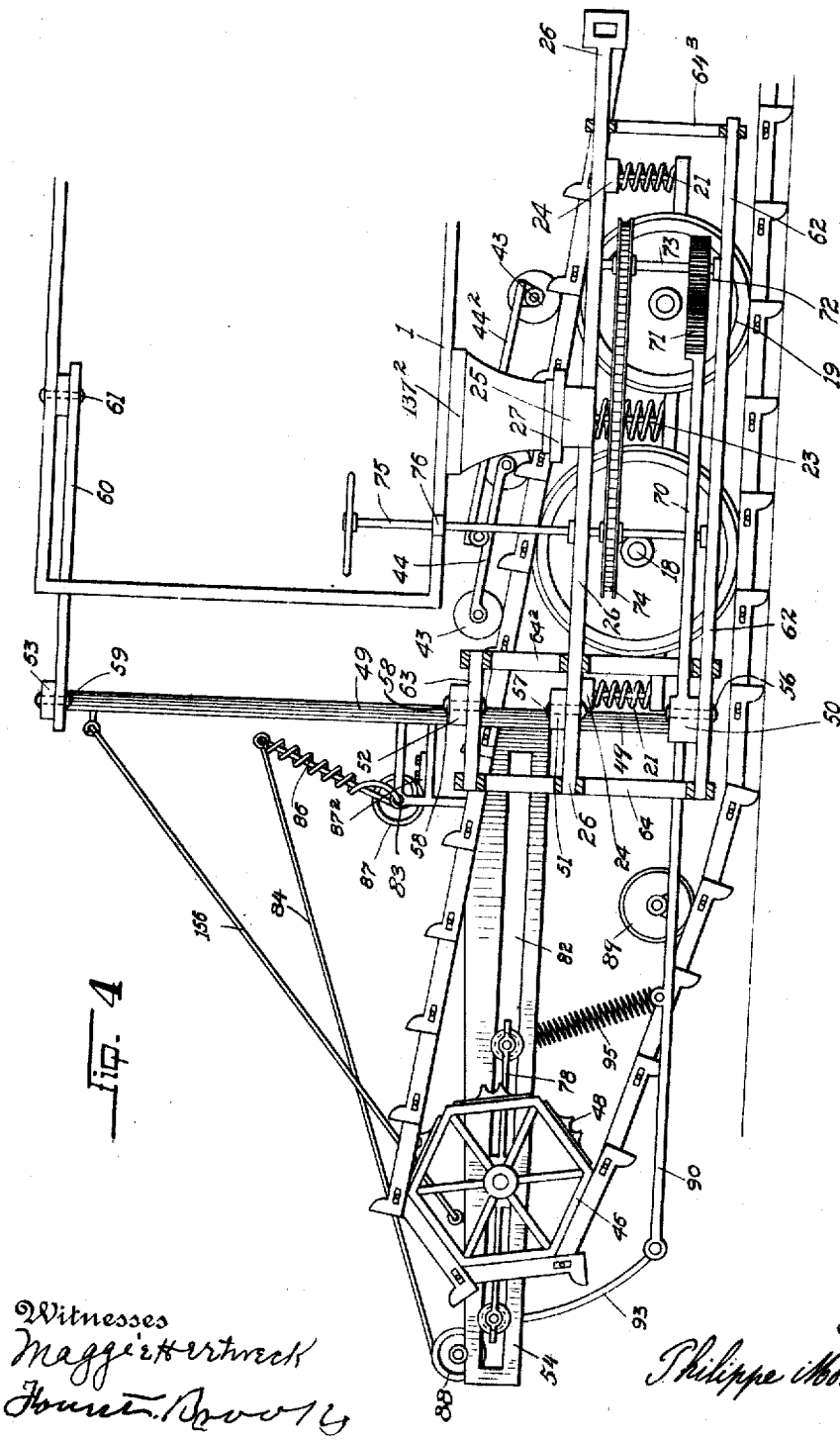

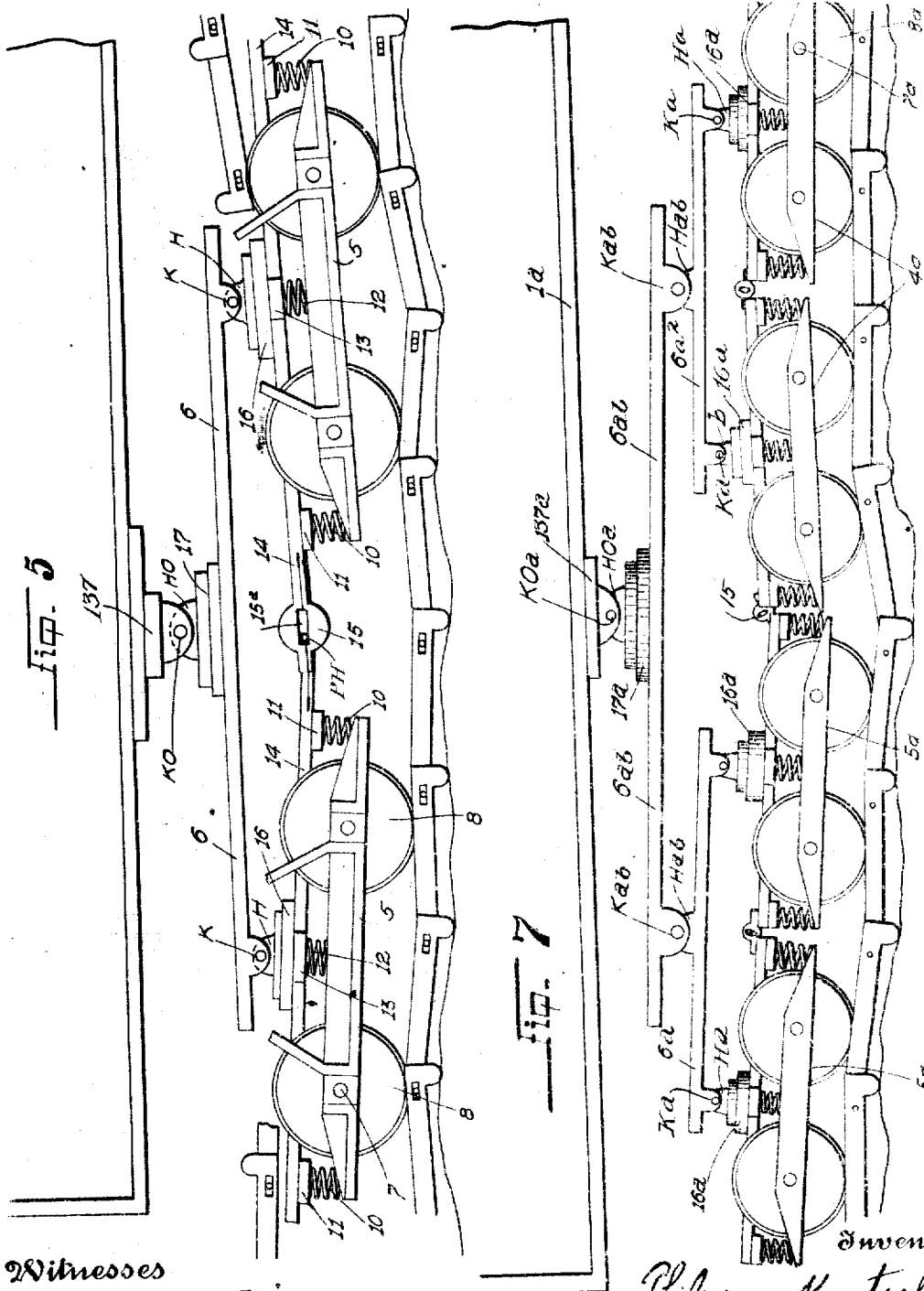

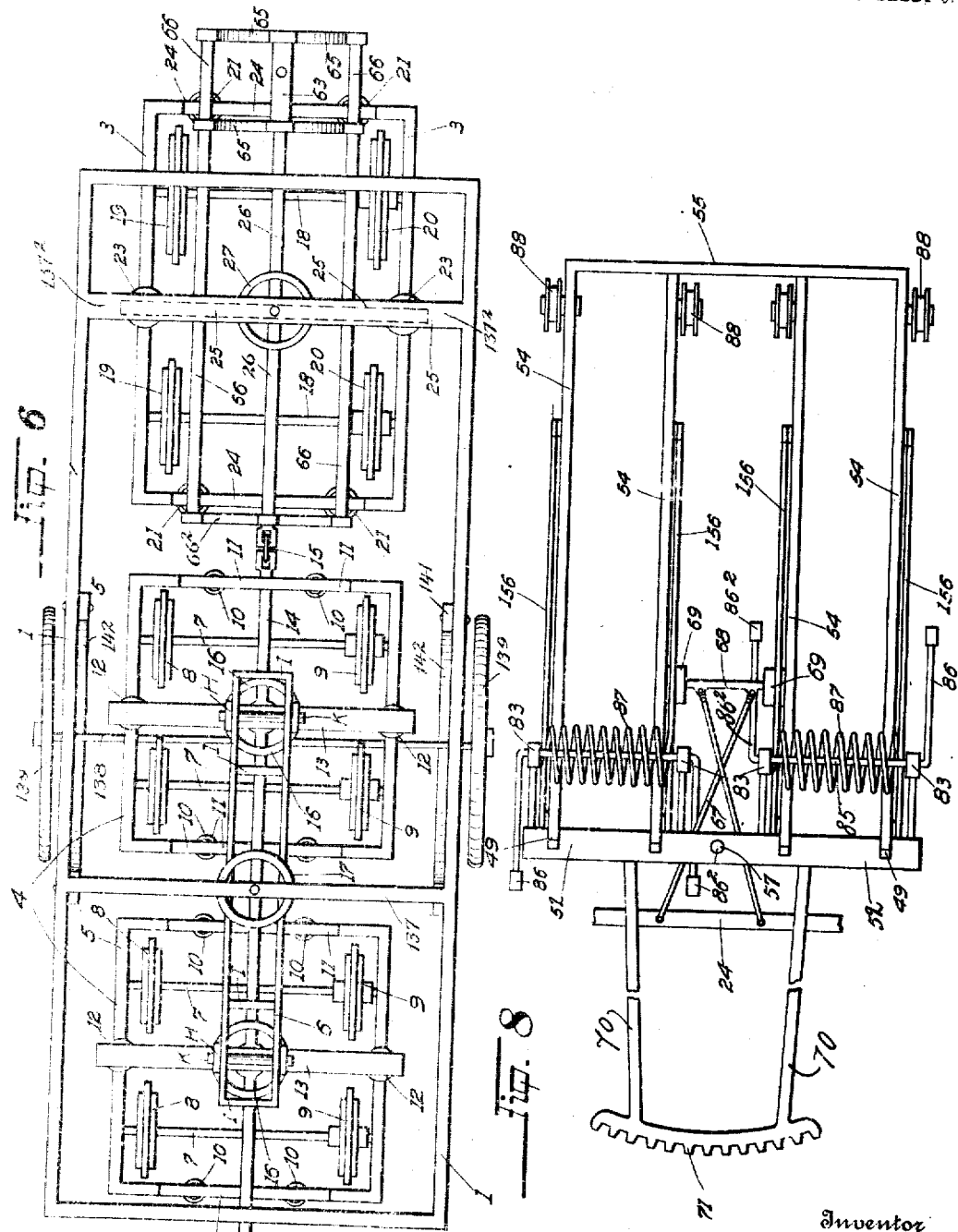

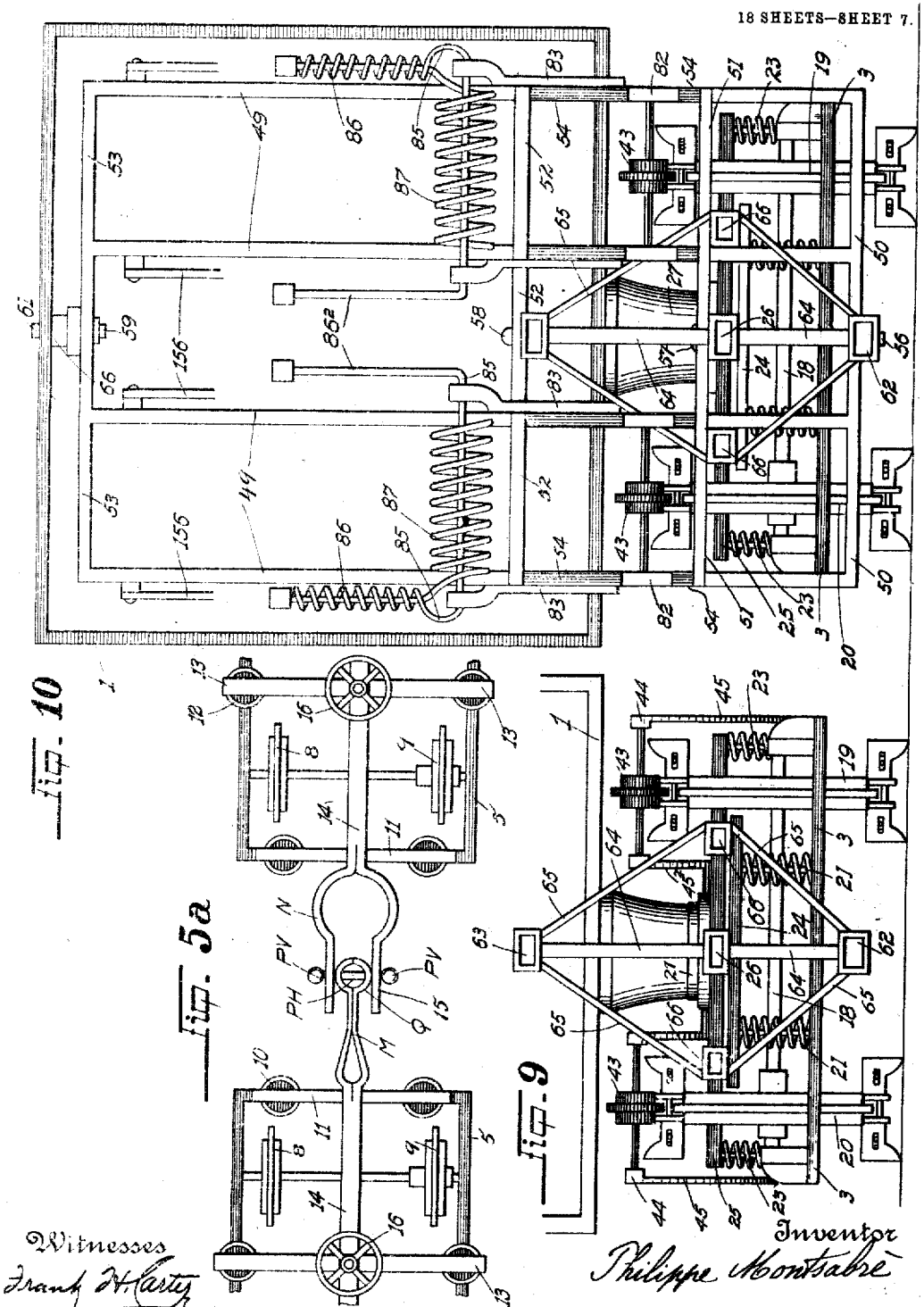

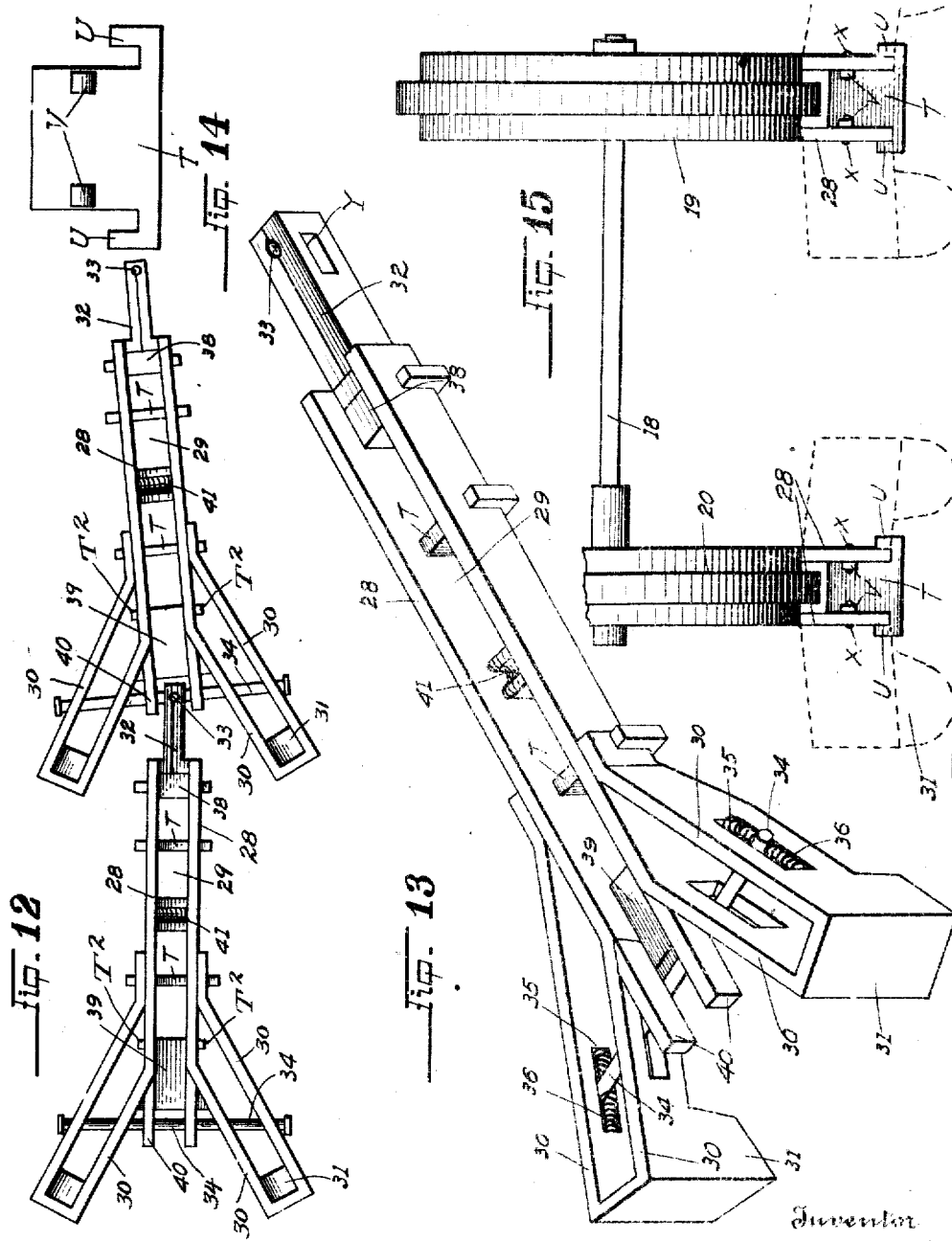

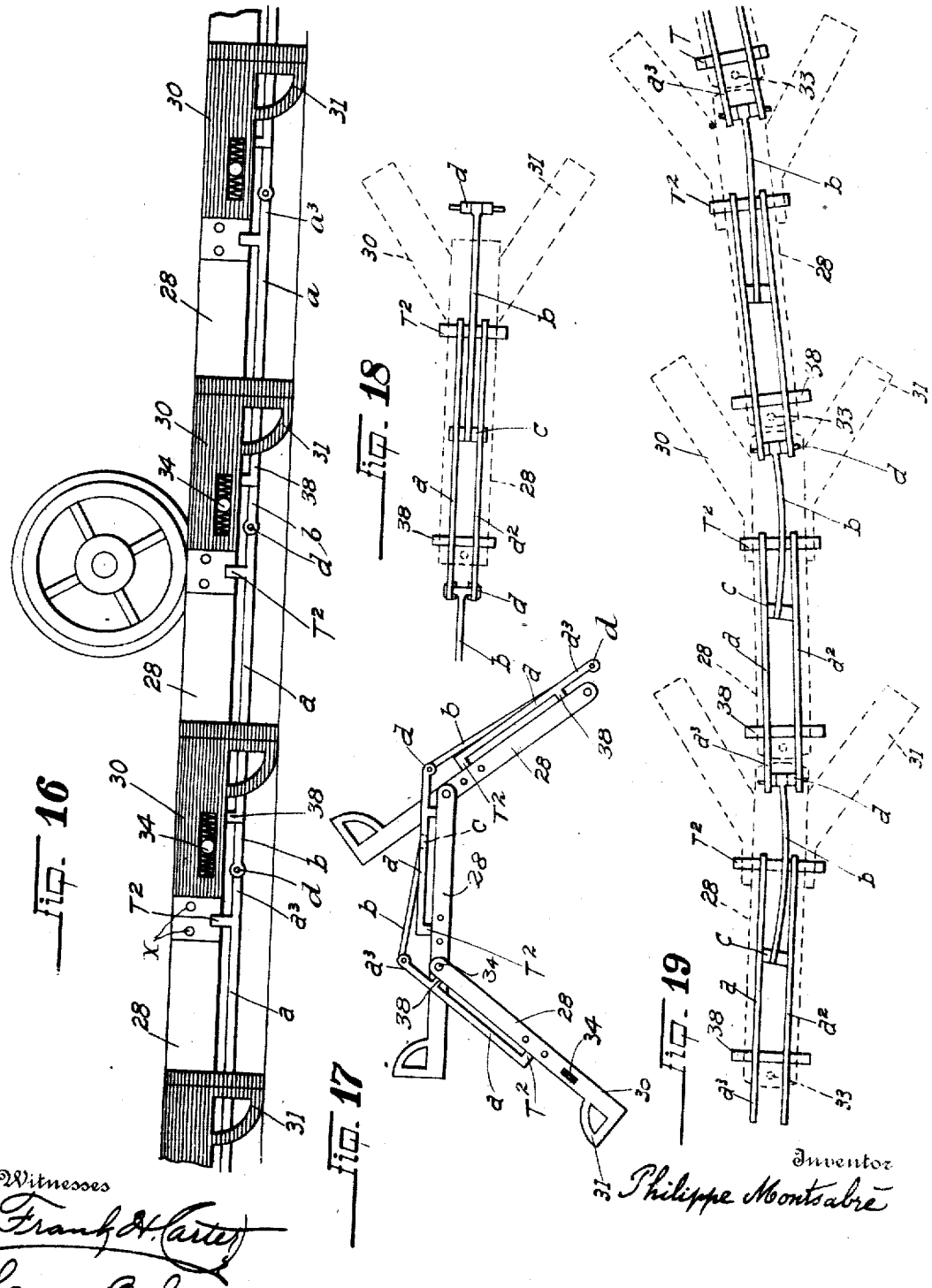

P. MONTSABRE.
ENDLESS TRACKS MOUNTED ON WHEELED CARRIERS.
APPLICATION FILED DEC. 5, 1910.
1,017,443.
Patented Feb. 13, 1912.
18 SHEETS—SHEET 10.
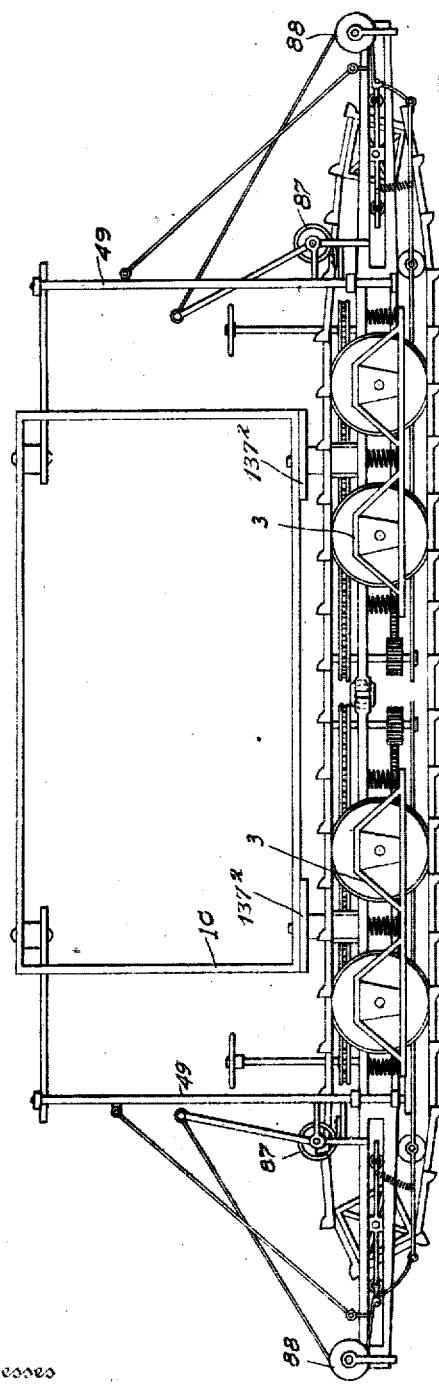
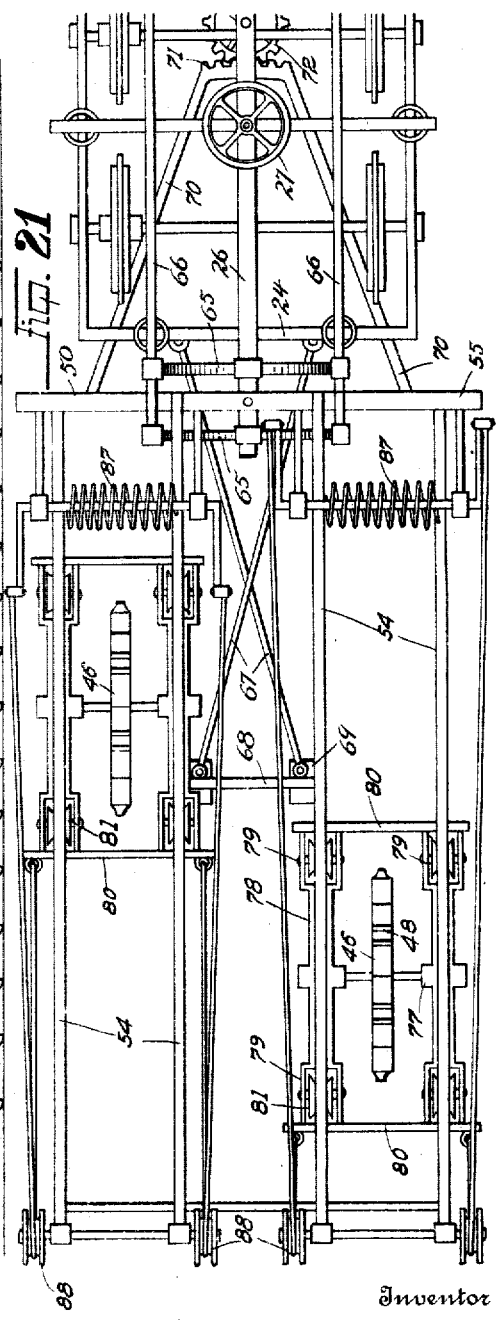
Witnesses
Frank H. Carter
Cora B. Carter
Inventor
Philippe Montsabre

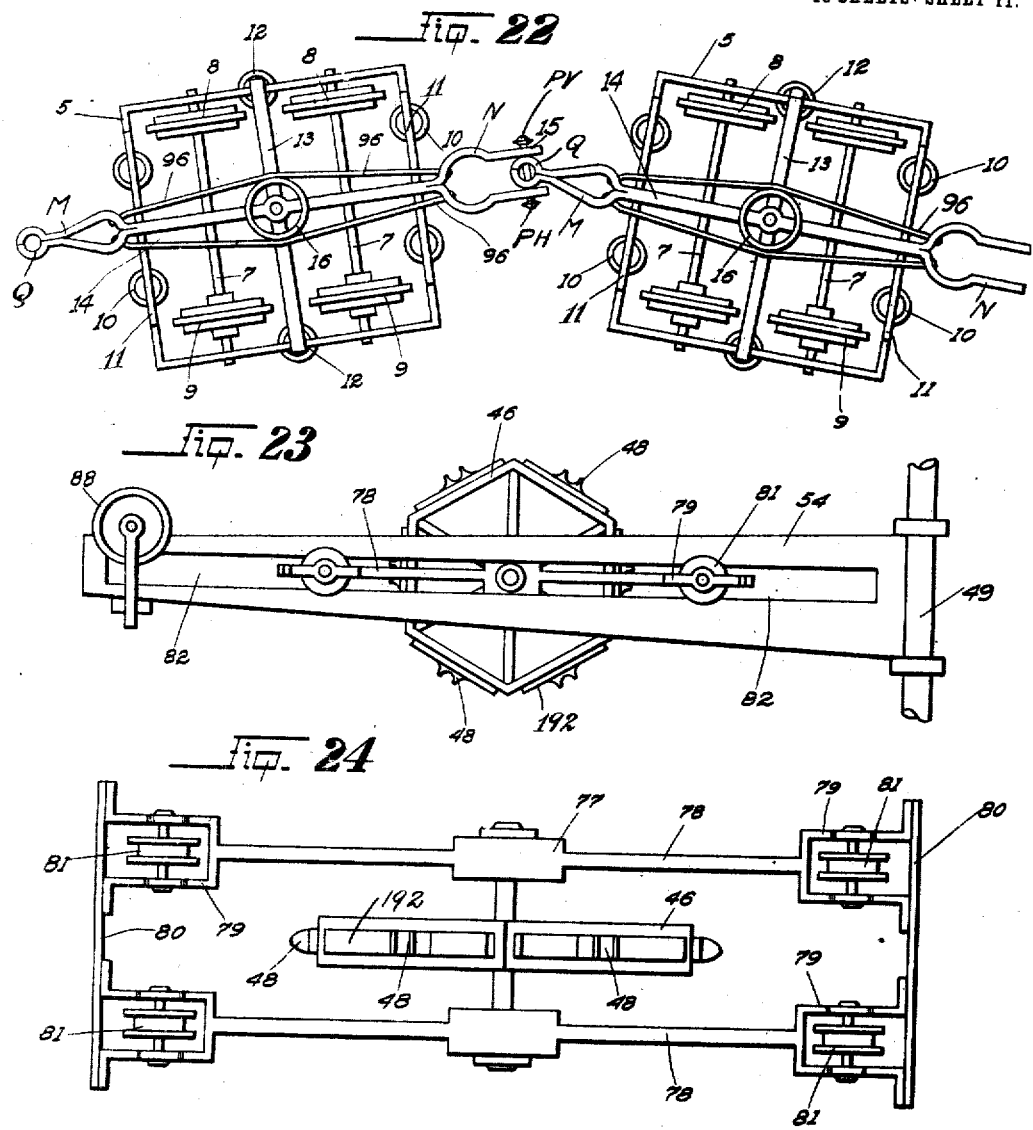

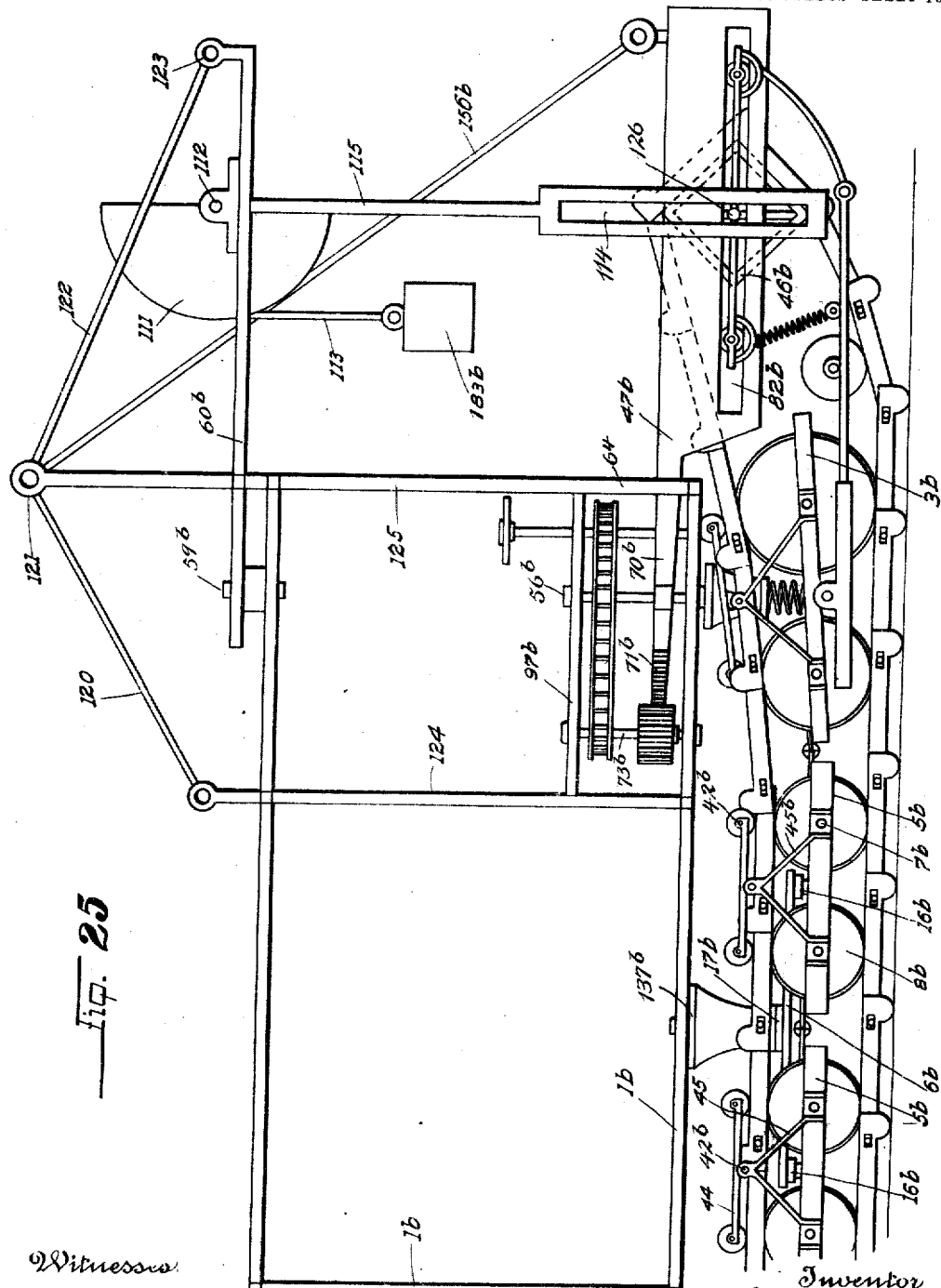

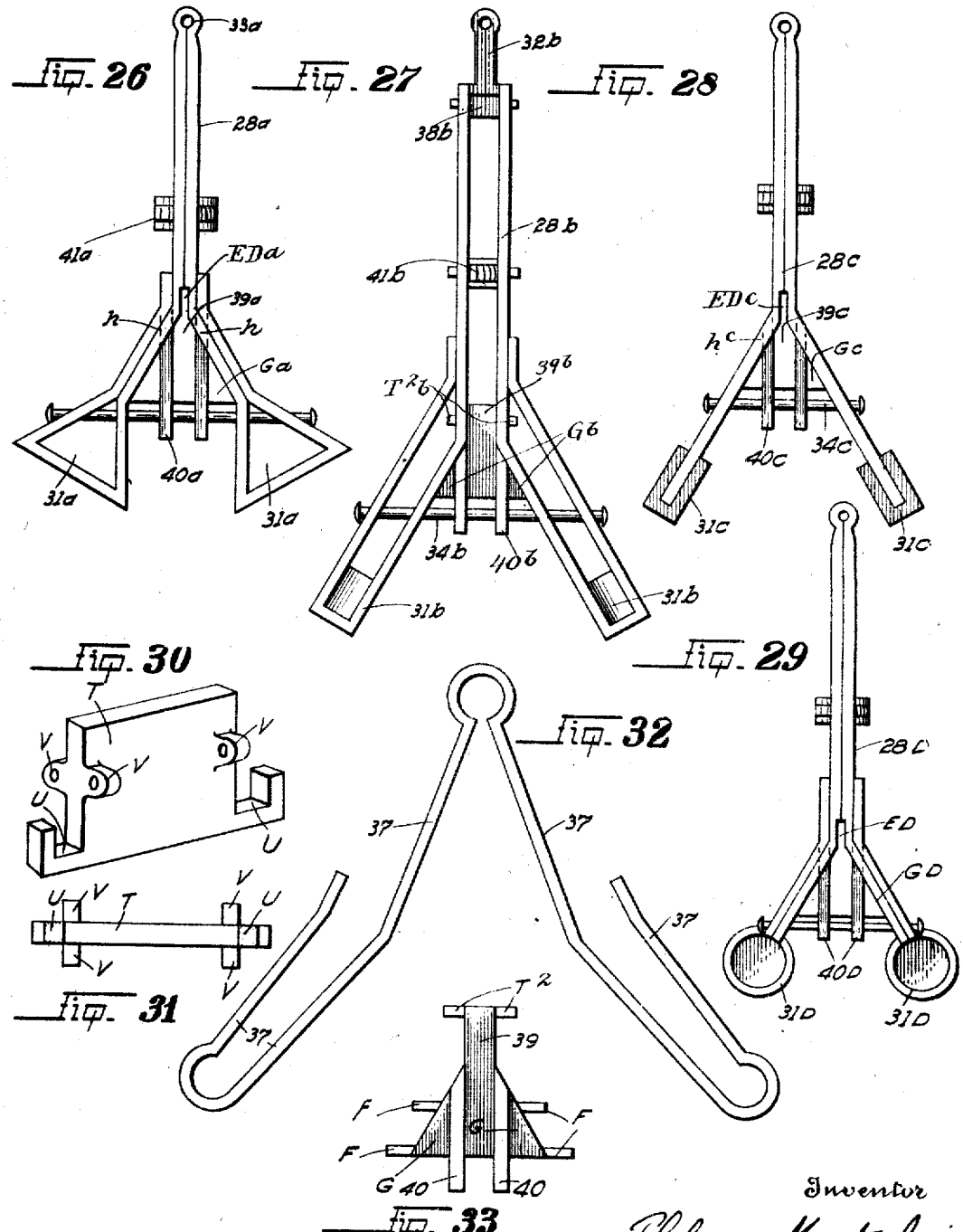

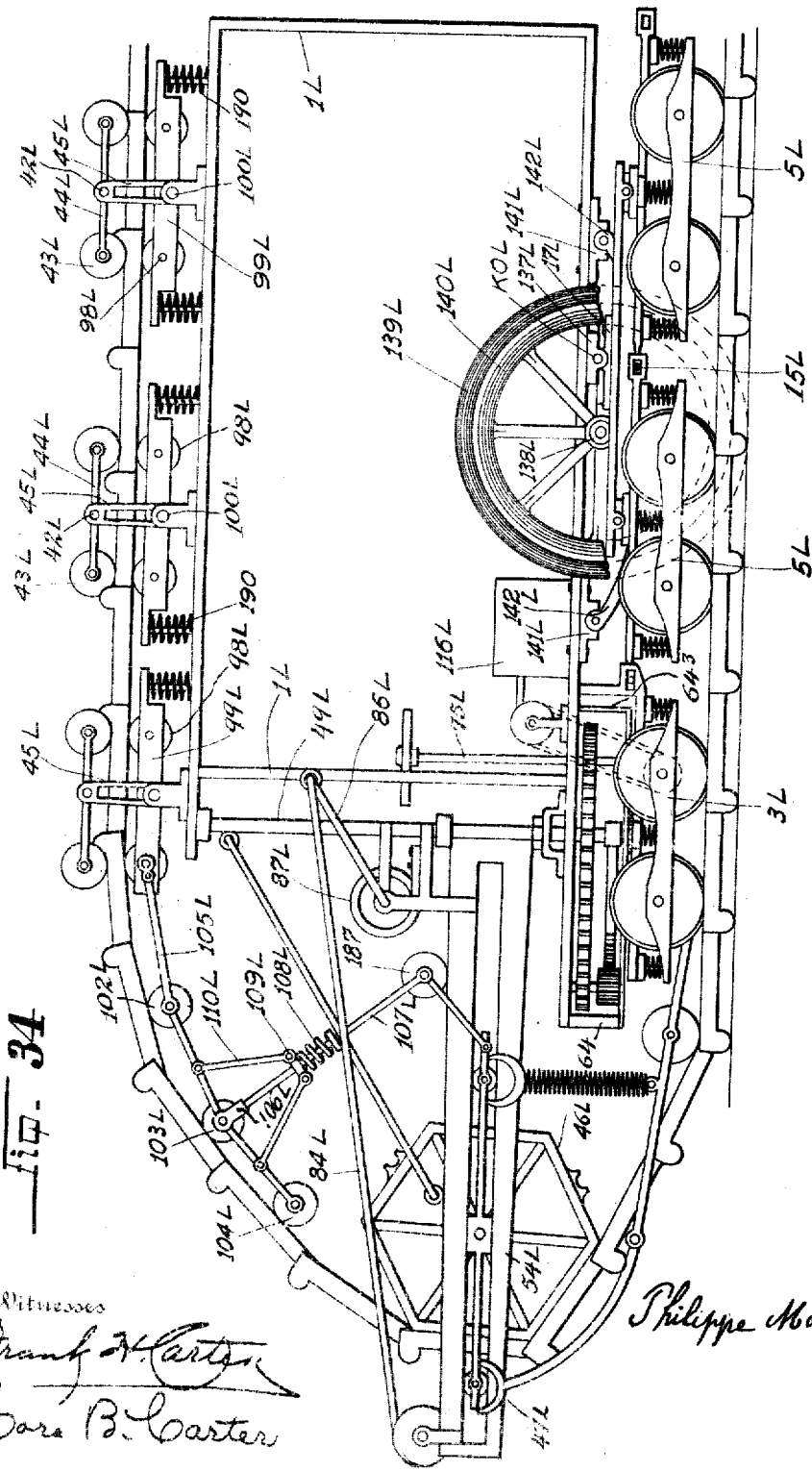

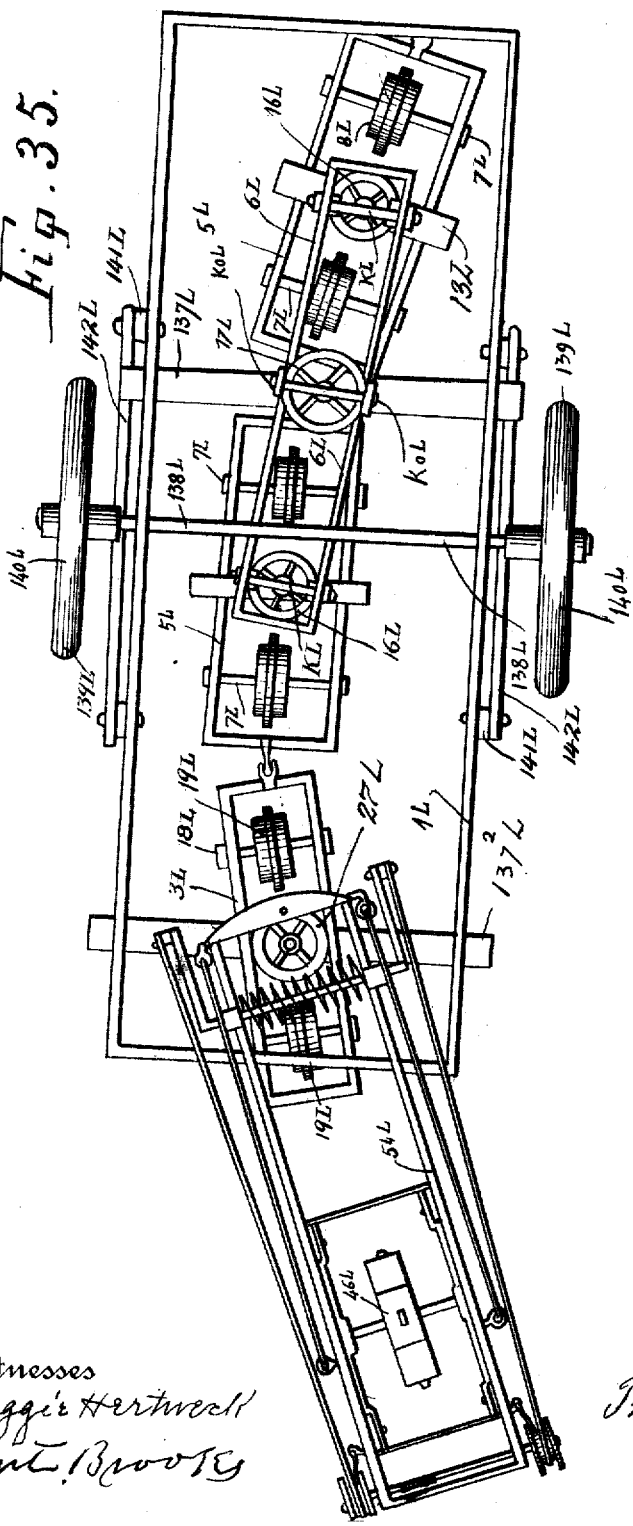

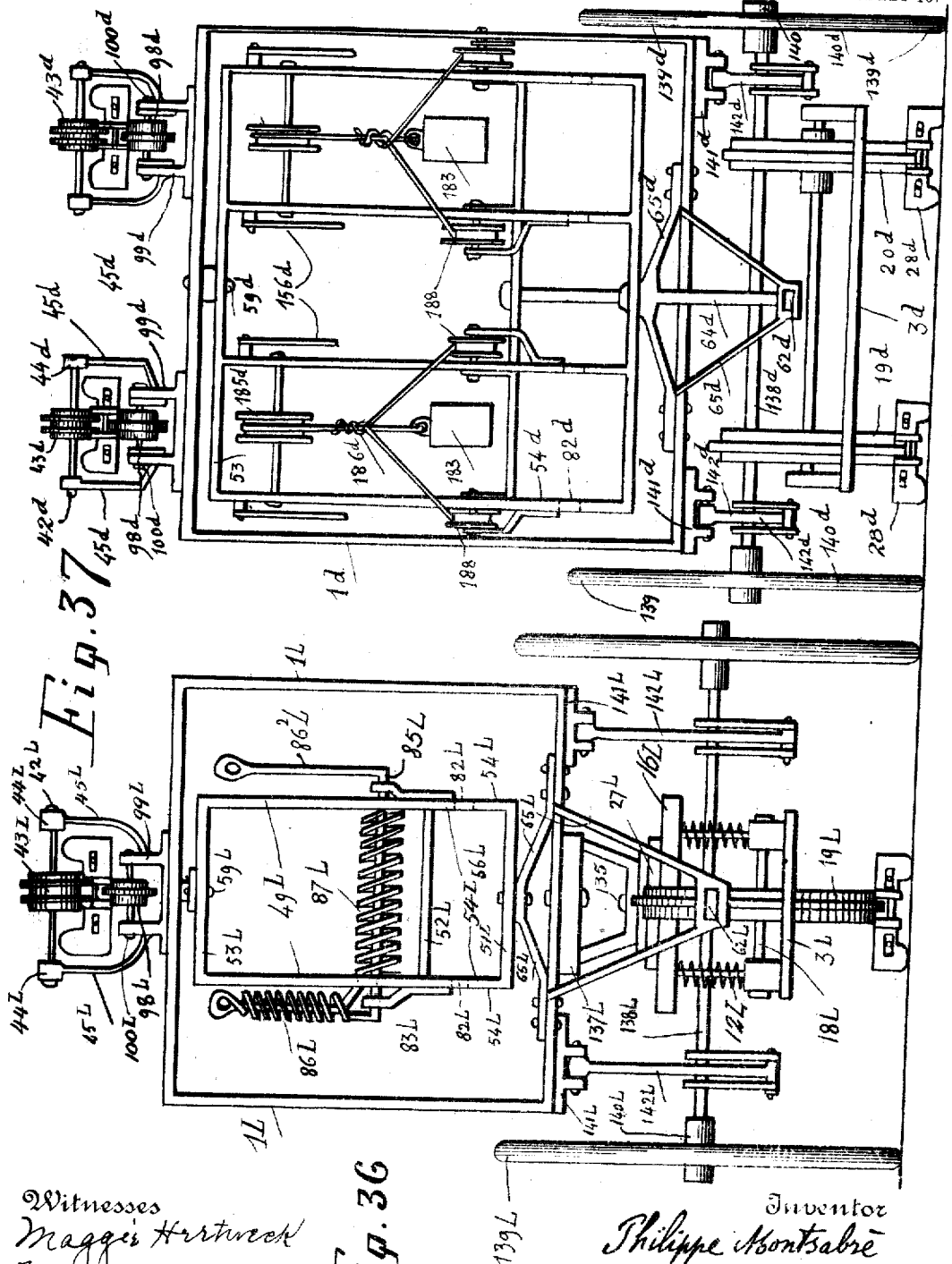

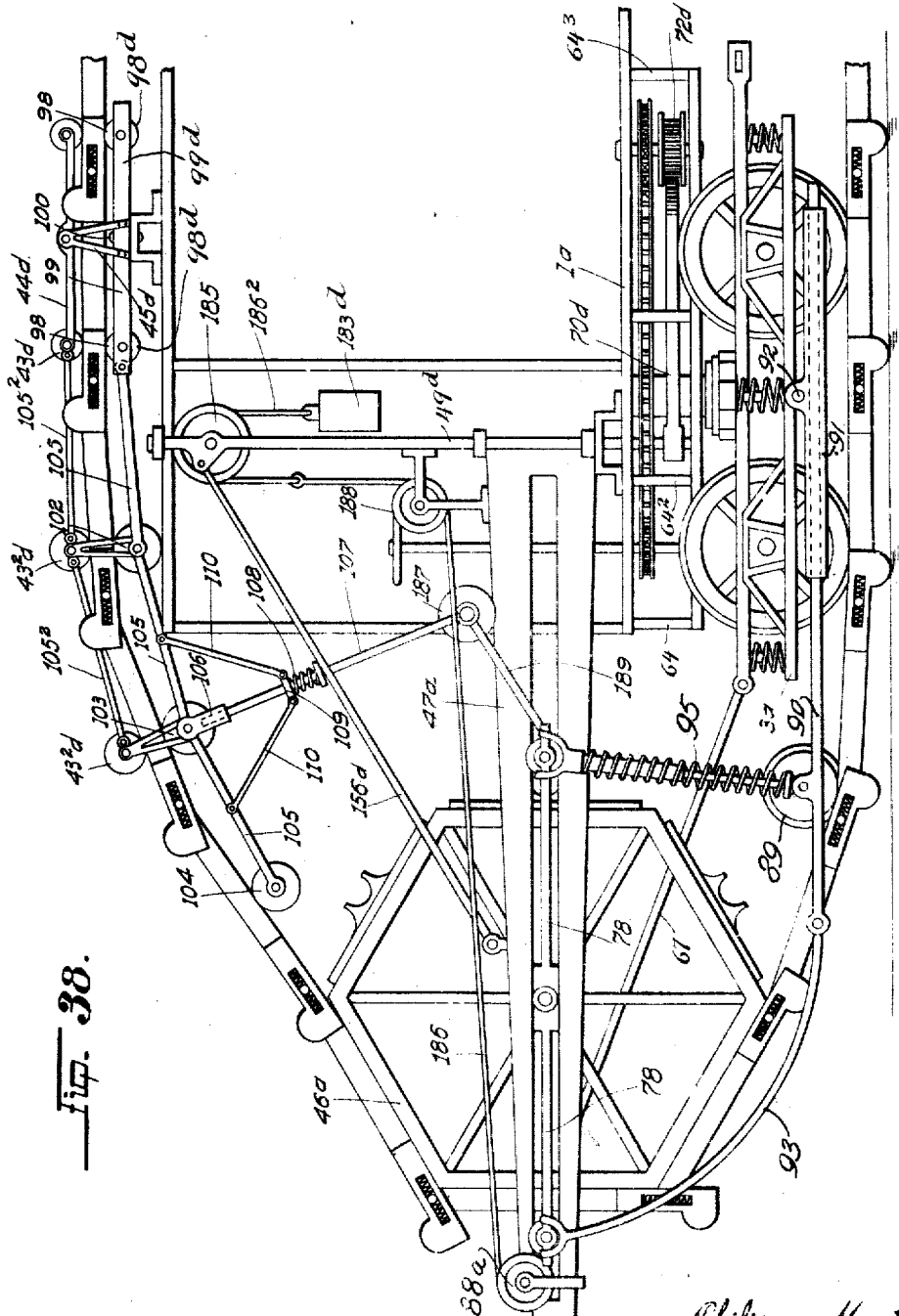

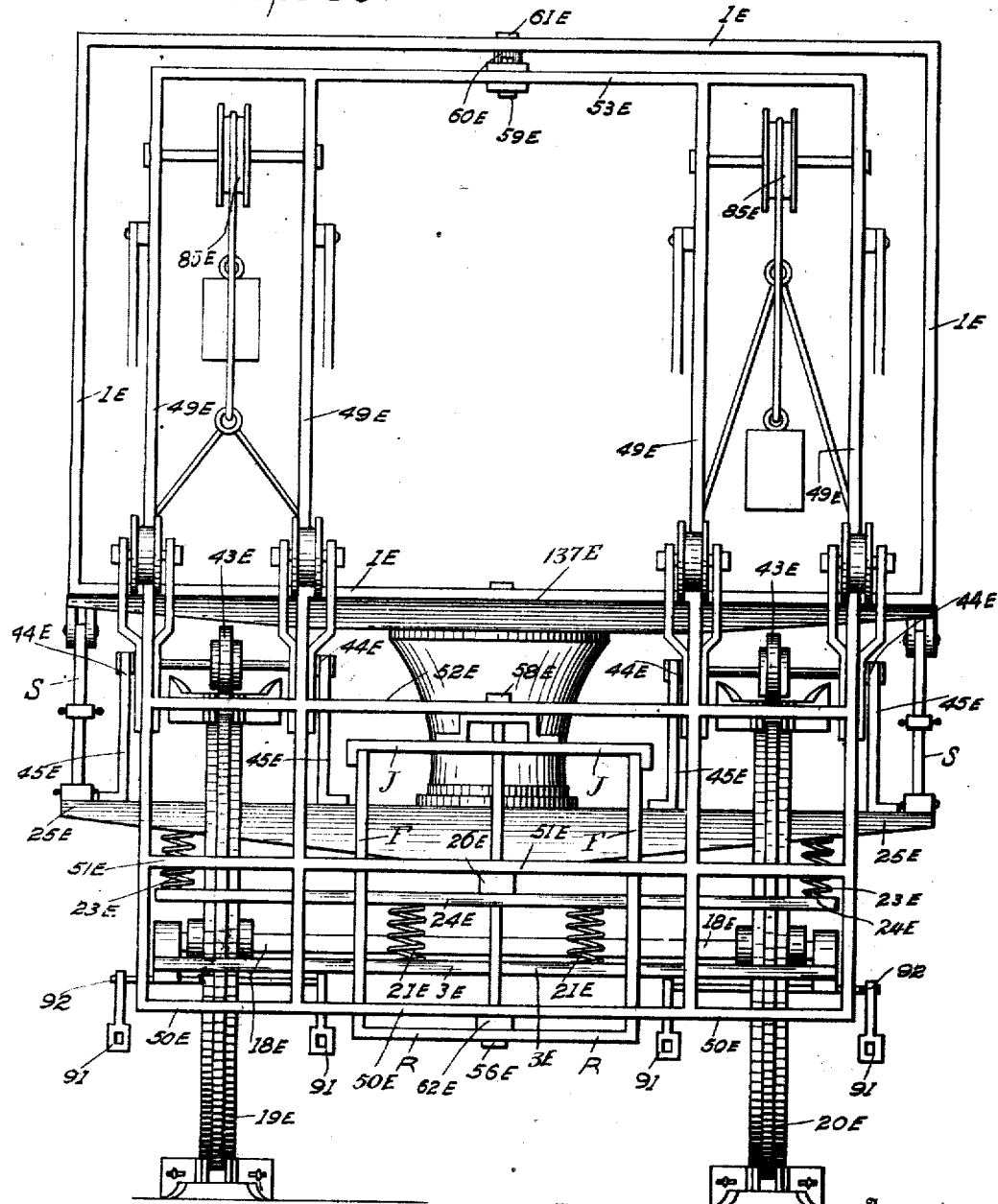

UNITED STATES PATENT OFFICE.

PHILIPPE MONTSABRÉ, OF FRESNO, CALIFORNIA.

ENDLESS TRACKS MOUNTED ON WHEELED CARRIERS.

1,017,443.   Specification of Letters Patent.   Patented Feb. 13, 1912.

Application filed December 5, 1910. Serial No. 595,741.

*To all whom it may concern:*

Be it known that I, PHILIPPE MONTSABRÉ, residing at Fresno, in the county of Fresno and State of California, have invented some new Devices for the Construction of Endless Tracks Mounted on Wheeled Carriers, of which the following is a specification.

My invention relates to improvements in traction engines of the character set forth in Patent No. 865,605, granted to me September 10, 1907, and which consists of endless tracks and wheeled carriers on trucks arranged to travel on the tracks and provided with means for picking up and laying down the same as the engine advances.

The principle object of my present invention is to provide a mechanism of this character having two independent and parallel endless tracks so constructed that they will be automatically laid in concentric curves when the machine is turned to either side, the complete mechanism operating with ease and evenness when turning or following curves as well as in moving forward in a straight line.

These endless tracks which are composed of overlapping flexibly jointed sections, are provided with means which are arranged to act reciprocally in coöperation with the truck wheels of the cars, so that every section of the laid track is pressed firmly and evenly against the ground and produces substantial rigid track ways; and the tracks are also provided with means carried by the cars for distributing evenly the load of the cars on the consecutively laid track sections, and with means for balancing the cars transversely when the mechanism passes over the inequalities of the road.

The endless tracks and the end cars are also coöperatively combined with additional means for picking up and laying down the track sections that consist of a system of tension devices operating at the looped portions of the endless tracks, and of a system of spring and roller devices for laying down and picking up the track sections as required, and means for guiding and supporting the endless tracks.

The whole construction is arranged as a complete mechanism in which all the parts act in conjunction with one another and in the manner to be described in a later part of the specification.

Modified forms of the invention are also described and illustrated in the accompanying drawings, and some of them relate more particularly to carriers provided with an endless track placed in the center of the machine, as it is clear and evident that the number of endless tracks which are used in the construction of this machine does not materially change the lines of construction which have been set forth.

With the foregoing and many other objects in view, the invention consists also of certain combinations and arrangements of parts, and in the details of construction hereinafter fully described and claimed, and illustrated in the accompanying drawings, in which:—

Figure 1 is a side elevation of a machine of the class described embodying my invention. Fig. 2 is a plan view showing the arrangement of the trucks and car bodies illustrated in Fig. 1 and indicating the relative position of said parts when the machine is moving on a curve. Fig. 3 is a detail side elevation of one end of the machine, and showing the parts more in detail than in Fig. 1. Fig. 4 is a detailed view of the subject matter shown in Fig. 3 with several parts removed in order to show more particularly the construction, in the central part of the end of the machine. The view is taken with the parts in a slightly different position to that shown in Fig. 3. Fig. 5 is a side elevation of a combination truck which supports the rear end of a car in this machine. Fig. 5ᵃ is a detail plan view of a loose connection preferably used between the trucks of the machine. Fig. 6 is a detail plan view of the trucks for supporting one of the cars, and the under-carriage frame carried thereby. Fig. 7 is a side elevation of a modified form of combination truck. Fig. 8 is a detail plan view of a supporting frame for the guiding mechanism used adjacent to the end portions of the machine. Fig. 9 is an end elevation looking at the front of truck 3, and showing the under-carriage central frame. Fig. 10 is an end elevation partly in section looking at the front or rear of the machine, parts being removed in order to show the guiding frame more particularly. Fig. 11 is a plan view of several of the flexibly jointed sections of the endless track. Fig. 12 is a detail plan view of several jointed sections of a modified form of endless track. Fig. 13 is a perspective view of one of the track sections or members shown in Fig. 12. Fig. 14 is an end elevation of a block used to brace the track section. Fig. 15 is a detail view of a pair of parallel endless track sections with truck wheels on them. Fig. 16 is a side elevation of several track sections connected together, and with a car wheel mounted thereon in order to show its relative position thereto. Fig. 17 is a detail showing the mechanism of a spring rail device disposed under the main track sections. Fig. 13 is a plan view of a section of the spring rail device shown in Fig. 17. Fig. 19 is a plan view of a plurality of spring rail sections connected together under the main track sections, the latter being shown in dotted lines. Fig. 20 is a side elevation of another embodiment of this invention, in which two trucks are employed for supporting a single car body. Fig. 21 is a plan view of a tension device mounted on the guiding frame member. Fig. 22 is a detail plan view showing two flexibly connected single trucks. Fig. 23 is a detail side elevation of a sprocket wheel or drum for an endless track, embodying this invention, and guiding means for said wheel. Fig. 24 is a plan view of the drum or sprocket wheel shown in Fig. 3, together with its sliding carriage. Fig. 25 is a side elevation of one end of the machine, showing a modified form of tension device for the loop portions of the endless tracks. Figs. 26, 27, 28 and 29 are detail plan views of modified forms of track sections, which may be used in place of those shown in Figs. 12 and 13. Fig. 30 is a perspective view of a block used to brace a track section. (See also Fig. 14). Fig. 31 is a plan view of Fig. 30. Fig. 32 indicates how the modified form of track section can be formed from a single strip of material. Fig. 33 is a detail of a plug used with a track section. Fig. 34 is a side elevation of an end portion of a modified form of the machine embodying this invention in which the return stretches of endless track are supported overhead. Fig. 35 is a plan view with parts removed of the whole device, particularly designed for a single centrally arranged endless track. Fig. 36 is an end elevation of one end of the machine shown in Figs. 34 and 35, with several parts removed. Fig. 37 is another embodiment of this invention having a modified form of tension device for the loop portions of a pair of parallel endless tracks, in which the return stretches of the same are arranged to pass over the car. Fig. 38 is a side elevation in detail of the end portion shown in Fig. 37, and the tension device used in this modification. Fig. 39 is a view in elevation with parts removed showing modifications in the construction of the under-carriage frame and in the tension device.

Similar reference characters refer to similar parts throughout the drawings, and in the modifications additional symbols have been placed upon parts of a like nature so as to make them more easily recognized, with respect to the parts originally described.

In the preferred embodiment of my invention illustrated in Fig. 1, I have shown two car bodies 1, which may be of any form and construction, and which are flexibly connected at 2.

Each of the cars is shown as supported by a single outer truck 3, and by a double inner truck, called combination truck 4, which latter consists briefly of two or more wheeled trucks 5, united to one another by a horizontally extending connecting frame 6 designed to support one of the ends of the car body 1, as will be understood on reference to Figs. 1, 2, 5 and 6. A pair of rubber tired wheels 139 resting on the ground on either side serve to balance each car transversely.

Proceeding now with the detailed description of a combination truck 4, see Figs. 5 and 6, each of its sub-trucks 5, consists of a rectangular truck frame carrying suitable bearings for axles 7, on the end portions of which are arranged track engaging wheels 8 and 9. The wheels 8 are fixed to the axles, but the wheels 9 have enlarged hub portions which enable them to slide longitudinally on said axles so that said wheels may adapt themselves to the two separate and independent endless tracks, which may or may not be at the same distance from each other on account of the inequalities that may be encountered on road surfaces. To give elasticity in a vertical plane to these trucks, and to prevent sharp jolting when they pass over track sections placed on rough or unequal surfaces of the road, (see Figs. 5 and 6), I provide, a pair of springs 10 mounted on the end bars of the frame of each truck 5, and these springs 10 serve to support opposite transverse bars 11, for a purpose to be presently explained. Arranged on the central portion of the side-bars of said truck frame are springs 12, supporting the ends of bolster 13.

To make the consecutive trucks 5 follow the straight as well as the angular and curved paths of the track sections, a centrally and longitudinally arranged directing bar 14 is provided and supported by the opposite transverse bars 11, of each truck, and the consecutive directing bars are loosely connected together by means 15, which will be fully described hereinafter. At this point it is necessary to note, that the trucks of this machine are fitted to go on the straight or curved portions of the track sections by the combined action of the truck flanged wheels, which are fixed to their axles, and by the consecutive directing bars carried by all of the trucks of this machine.

In relation with the same subject, it can be noticed that all the wheels of the trucks, have a movement independent of each other, so that they can readily follow the sharp curves on the track without producing a sensible amount of friction on the laid track sections; and also that if this provision was not made and the truck wheels slipped on the rail track when turning, as is the case on a railroad track, the limited length of the endless track would be rendered unfit for use, in a short time.

Directing bar 14 intersects at right angles the bolster 13, and for this reason it is preferable that they should both be integrally connected and so that their common top will be in the same plane, as they have the same object which is to support a fifth-wheel 16, as shown in Figs. 5 and 6.

The bolsters 13 of the trucks 5, in combination with the directing bars 14, are fixed to the lower members of the fifth wheels 16, the upper members of which are arranged pivotally near the ends of a horizontally extending connecting frame 6. To effectuate this construction, the upper members of the fifth-wheels 16 are provided with transversely disposed bearings H. The ends of the connecting frame 6 are also provided with bearings which are arranged oppositely to the bearings carried by the upper portion of the fifth-wheels 16, so that transverse and horizontally disposed pivot members K pass through these corresponding bearings, and secure the connecting frame 6 oscillatable vertically on the fifth-wheels 16, as shown in Figs. 3, 5 and 6. Another fifth-wheel 17 is mounted on the central upper portion of the connecting frame 6, and the upper portion of said fifth-wheel 17 is arranged to carry a pair of bearings HO. A transverse beam 137 on the car carries a pair of bearings arranged to correspond with the bearings of the fifth-wheel 17, so that a transverse and horizontally disposed pivot KO, disposed in said bearings secures the connecting frame to the transverse beam 137 of the cars, as shown in Figs. 2, 3, 5 and 6.

From the description just given it can be seen, that a combination truck has all the resilient advantages desirable, as the intermediate frame 6 has a vertical swinging movement independent of the car bodies, and is gradually lifted when the trucks of the machine are speeding over the inequalities of the road, and simultaneously the car bodies are slowly raised and stand approximately on an even keel, see Figs. 5 and 6. Also, the numerous wheels of the whole machine are arranged to act in combination with the individual track sections which are laid on the ground, as these track sections have overlapping relations between them, and their pivoted members are ahead and out of alinement with their foot members, as it will be disclosed hereinafter, so that each wheel which runs on them will act on several consecutive track sections and press and clench them most effectively against the ground so as to produce a firm, solid and uniform track for the wheels of the cars to run on, and thus counteract the oscillations of the individual track sections under the sudden pressure or lack of pressure produced by the traveling wheels, as will be shown and described more fully hereinafter. All these advantages are increased by cars provided with combination trucks having sixteen wheels as shown in Fig. 7, by which it can be seen, that the four consecutive trucks of that figure are assembled in pairs by means of the intermediate connecting frames 6ª and 6ª², the extremities of which are secured oscillatably on the horizontal and transverse pivots Kª maintained in the bearings Hª, on top of the upper portions of the fifth-wheels 16ª, carried by the trucks.

A third connecting frame 6ªᵇ, is pivotally secured at its extremities to the horizontal and transverse pivots Kªᵇ, which are mounted above the central portion of the two connecting frames 6ª and 6ª² and, on the central portion of the third and upper connecting frame 6ªᵇ, is mounted a fifth-wheel 17ª, arranged to support one end of the car body. At this point, it should be noticed that the upper portion of the fifth-wheel 17ª carries bearings HOª, which are connected with the bearings carried by the transverse beam 137ª, of the car so that a pivot KOª secures them to one another, so that the four combination trucks are oscillatable vertically under the bottom of the car.

All the consecutive trucks of this machine whatever they may be, single trucks 3 or combination trucks 4, are connected to one another at 15 by a loose system of connection which is particularly devised so as to steer the trucks by one another to follow the curves of the road when the machine is turning to the right or to the left. This arrangement for turning is shown on an enlarged scale in Figs. 5 and 5ª and 22, in which it can be noticed, that the centrally placed directing bars 14 of two consecutive trucks have their extremities made of two differently shaped portions M and N, which are arranged to slide horizontally into one another so as to allow the consecutive trucks to be at variable distances from each other; also these portions M and N are made of resilient bars which are arranged to flex transversely in order to impart a side motion to the consecutive trucks when they are turning on the track sections.

The spring portion N is made with two symmetrical jaws curved near their ends, which are at some distance from each other to receive the circular end of the double springs M, which are set close together in order to allow them a side movement, between the jaws of the springs N.

The circular end Q and the jaws of springs N are connected by a transverse and horizontal pivot PH, which engages the horizontal slot 16ª, shown by Fig. 5, and this horizontal pivot PH, has rounded ends designated by the numerals PW in Figs. 5ª and 22 to keep the jaws of the spring N in place.

Each of the single or outer-trucks 3, which are at the ends of the machine are of a similar construction to the combination trucks previously described, but serve for several other purposes subsequently referred to, and each comprises a rectangular truck frame provided with bearings for transverse axles 18, which latter carry fixed track wheels 19 and slidably mounted track wheels 20, see Figs. 2, 3, 4 and 6.

Springs 21 arranged on the end bars of the single outer trucks 3 support the transverse bars 24, and a pair of springs 23 support the ends of bolster 25 upon the side frame of said truck 3.

Each of the end trucks of this machine carries also a centrally and longitudinally disposed directing bar 26 which is loosely connected to a similar directing bar 14 carried by the adjacent combination trucks, as shown in Figs. 2, 6.

A fifth-wheel 27 is arranged on the common top of the directing bar 26 and the bolster 25 so as to support the transverse beam 137ª of the car body 1, so that the end trucks 3 are permitted to have a lateral swinging movement on the tracks and act in coöperation with the combination trucks, and also in coöperation with the swinging of the guiding frame as hereinafter set forth.

Owing to the construction of the trucks above described, it will be seen that on each side of the machine there will be a longitudinal series of wheels for movement over two separate or independent flexible endless tracks. Each of these tracks consists of section or members 28 flexibly jointed for both vertical and horizontal or lateral swinging movement, and in the preferred form of tracks, shown more particularly in Figs. 11, 12, 13, 14, 15, 16, the track section have longitudinal body portions 28 which are grooved or channeled at 29 to receive annular radially projecting flanges formed on the peripheries of the truck wheels 8, 9, 19, 20.

The body portions 28 of the track sections have at one end wings 30, diverging laterally and angularly so that said sections are substantially Y-shaped when viewed from above, see Figs. 11, 12, 13, 16, 18, 26, 27, 28 and 29.

The wing portions 30 are provided on their outer ends, with foot portions 31 which are adapted to make contact with the ground, and which may be made of rubber, leather, metal plates or blocks of other desirable materials, and may be of any suitable shape according to the nature of the surface over which the machine is to travel.

Each track section is adapted to receive the small end 32 of the next adjacent section so that the several sections of the track are arranged in overlapping relation, in order to give stability to each individual track section, which in these conditions form a substantial support for the track wheels, seen in Figs. 12 and 13.

The flexible connection adjacent to the track sections consist in arranging the small end 32 of each section on a pivot 33, which latter is centrally arranged on a rod 34 disposed transversely near one end of the channeled body portion of the track section and in the wing portions 30 of such sections, as is clearly shown in Figs. 11, 12 and 16.

Fig. 13 shows that the transverse horizontal bar or rod 34 is arranged for forward and rearward sliding movement in slots 35, formed in the wing portions 30, and against coil springs 36 arranged in said slots and on opposite sides of the rod 34 for yieldably maintaining it in the central portions of such slots. This elastic and pivotal connection permits the track sections to move longitudinally toward and from each other, so that when the road is soft or wet and lets the individual track sections sink more or less in the ground, a slight augmentation or diminution in length between the track sections is made possible, and thus prevents the track being strained or broken; this elasticity of the track in a longitudinal direction is also illustrated in Figs. 3, 4, 5, 9, 16, 25 and 38. These individual track sections swing vertically, laterally or horizontally in order that the endless tracks may be readily turned in a comparatively short radius by the mechanism carried by the machine, which runs on these tracks.

While the track members 28 may be specifically constructed in various ways, it is preferable to make them from a one-piece metal blank 37, shown in Fig. 32. In the formation of these track sections a blank bar 37 is first given the shape shown in Fig. 32 and then shaped to provide the channel body portion, the reduced end and the diverging wing portions of the track section.

To transversely strengthen the construction of a track section, a block T, the specific construction of which is illustrated in Figs. 14, 30, and 31 is placed between the spaced side bars or plates forming the channeled body of the section, see Figs. 12, 13 and 16.

The block T, consists of a small rectangular shaped frame having L-shaped arms U at its two lower corners, the vertical sides of the frame are applied against the spaced plate rails 28 forming the sides of the channel 29 of a track section. The L-shaped arms U engage the bottom of the plate rails 28 of a track section in order to brace them transversely to one another. And to secure the block T and to maintain it on the plate rails of a track section, I provide a pair of side ears V at the end of each block and near the top of the block frame T, which are placed in contact with the side plate rails 28, as shown in Fig. 15, so that bolts X secure the block to the rail plates by passing through the ears V.

As shown in Figs. 11, 12 and 13, a plurality of block frames T are used to strengthen each track section.

In the middle portion of each channeled body of a track section a pair of transverse bars 41 is secured for the purpose of engaging with the tooth members of a polygonal sprocket wheel 46 belonging to the guiding mechanism of the machine hereinafter described.

Another elemental part is ye necessary to complete the construction of a track section and is called the triangular block 39 or plug, illustrated in detail in Fig. 33 and which is placed and secured at the intersection of the plate rail members 28 with its wing members 30, see Fig. 12, and serves to establish a suitable connection between each following track section, and generally consists of a plate 39, shaped at one of its ends to engage in the channel existing between the side plate rails 28, of a track section, its other end G is enlarged, in order to be in contact with wing portions of a track section. F are tenons fastened to the end portion G as shown in Figs. 12 and 33. This triangular shaped block or plug 39 is provided on its upper portion with a pair of parallel rail portions 40, which are arranged so as to extend beyond the main plate bar rails 28 of a track section, see Figs. 12, 13 and 33.

The outer portions of the rail extensions 40, have a bearing on the rod 34, and receive between their sides, the reduced ends 32 of the following track sections, and thereby serve to bridge over the space between two sections.

The upper or return stretches of the two independent endless tracks may be supported overhead, that is above the cars of the machine, as shown in Figs. 34 and 38, but I also anticipate that they can rest and be acted upon by the wheels 8, 9 and 19, 20, of the several trucks as shown. It may be noted that said track engaging truck wheels may be all of uniform diameter as indicated in Figs. 20, 34 and 38, but I preferably make those nearest the ends of the machine of larger diameter.

To maintain the upper return stretches of endless tracks upon the tops of the truck wheels, I provide a system composed of spring rail devices which are secured to the truck sections and provided with retaining rollers 43, by the combined operation of which the over hanging main track sections are maintained and pressed on top of the car wheels, as can be seen in Figs. 1, 3, 4, 9 and 10. And the same system is applied if the over hanging track sections are passing on top of the cars and supported by wheeled trucks secured on the top of the cars, see Figs. 34, 36, 37 and 38.

The specific construction of the spring rail device $a$; $b$; $c$; $d$, is illustrated by Figs. 16; 17; 18; 19, and consists of a pair of parallel and lightly built bars, $a$ and $a^2$, between which is arranged to slide another bar $b$.

The parallel bars, $a$ and $a^2$, are secured on the bottom of the brace blocks 38 and $T^2$ of the main track sections, and one of their ends project ahead of its block support at $a^3$, in order to allow its motion around the horizontal pivot 34 of the main section, and also when the track sections turn around the polygonal drum wheel 46 of the machine, as shown in Figs. 3; 17.

The single bar rail portion $b$, is pivoted around a horizontal pivot $d$, at the end of the projecting double rail portion $a^3$, and its other extremity is maintained fixedly on a sliding plate $c$, operating between the spring bars $a$ and $a^2$. As the consecutive spring rails are not pivoted to flex transversely, they will be forced to bend or curve in proportion to the angle formed by two consecutive track sections, and consequently this system of spring rail devices also controls the flexure of the main track sections and acts in coöperation with all the means hereinafter described.

Retaining rollers 43 are arranged to engage the over hanging sections of the spring rail device just described; and provided with a pair of annular flanges which divide their peripheries in three parts, the central portion which engages the single spring rail $b$, and the two outer portions that are engaged by the double spring rail device $a$, $a^2$, so that the double flange projects on each side of the single spring rail $b$, and is projecting on the inside of the double spring rail $a$, $a^2$, as shown in Figs. 36, 37, 16 and 19. These retaining rollers 43 are rotatably mounted on hangers 44, which are mounted oscillatably on a shaft 42 secured on top of brackets 45 rising from the frames of the trucks 3 and 4, see Figs. 1, 3, 4, the inside bracket $45^2$, is secured on the truck bolster, as indicated in Figs. 9 and 10.

As shown by Figs. 1, 3, 9 and 10, the preferred form of the invention embodies a pair of parallel endless tracks, which are arranged to pass under the cars, so as to utilize the complete area of the same, for the transportation of freight and passengers and also so as not to take up much width of the road.

The two endless tracks which are thus placed in close proximity to each other, can be assimilated to one centrally disposed endless track although necessitating in that case the employment of certain additional means to balance the cars transversely which run on them. I will first state, that the bodies of the cars are balanced transversely on the bolsters of the trucks by any well known means, but it is evident that when the two closely disposed endless tracks are passing over the inequalities of the road, other means should be used to balance the cars transversely.

The additional balancing means preferably consist of a pair of rubber tires 139 fixed on the peripheries of wheels 140 which run on the road. The axles 138 of the wheels 140 are arranged near the middle portion of the car bodies 1, and secured to the central portions of longitudinally extending springs 142 secured by brackets 141 to the bottom of the car bodies, as shown in Figs. 2, 6, 34, 35 and 36.

A vertically and centrally placed frame which is called the under-carriage central frame, is secured on the front and rear trucks 3 of the machine as shown in Figs. 3, 4, 6, 9, and 10, and serves to support the guiding mechanism of the machine and the steering apparatus, but in the modified forms illustrated by Figs. 34, 36, 37 and 38, it can be seen that this same under-carriage central frame is supported under the bottom of the car. This modified position is more convenient for endless track passing on top of the cars.

The under carriage central frames which are disposed on the trucks 3, of the machine are more specifically illustrated by Figs. 4, 9 and 10, by reference to which it can be seen that the under-carriage central frame consists of the vertical bars 64, 64², 64³, united together by the central and longitudinal-directing bar 26, previously described, and by a longitudinal bottom bar 62, but the upper portions of the vertical bars 64 and 64² only, extend upwardly at the front of these trucks, are secured together by a small longitudinal bar 63, in order to support the upper portions of the guiding frame.

From the description given, it can be seen that the directing bar 26 which serves for other purposes than those which have been previously described, is also an integral part of the under-carriage central frame and serves to support it, when it is supported by the front and rear trucks of this machine. At this point, it is necessary to take notice that the vertical bars 64 and 64², are each provided near their middle portions with a rectangular aperture which serves to receive the free end portion of the directing bar 26, while the top and bottom bars 63 and 62 are simply joined to the bars 64 and 64² as shown in Figs. 9, 10 and 21. The front portion of the frame having the vertical bars 64 and 64² serves to pivotally hold the guiding frame of the machine as it will be hereinafter described, and the rear part of this central frame between the vertical bars 64² and 64³ serve to hold the steering mechanism of the machine, as hereinafter set forth, see Figs. 2 and 4.

It is evident that the under-carriage vertical frame formed by the bars 64, 64², 64³, 26, 62 ought to be braced transversely to withstand the strain to which it is subjected in that direction for operating the guiding and steering mechanism, and for that purpose the end trucks 3, carry in the same plane in which the directing bar 26 lies two opposite balancing bars 66, the ends of which are supported by the end transverse bars 24, carried by the trucks, as indicated in Figs. 2, 6 and 21.

In order to secure the balancing bars 66 to the central and vertical under-carriage frame, a number of braces designated by the numeral 65, shown in Figs. 6, 9, 10, 21, 36 are placed at the front of the trucks 3, and are provided with rectangular apertures which serve to engage the balancing bars 66, the upper bar 63 and the bottom bar 62 thus forming a substantially rigid construction in every direction, and as seen more particularly in Figs. 9, 10 and 21.

The guiding frame of the machine which is shown in detail in Figs. 2, 3, 4, 8, and 21, is arranged to be supported by the under-carriage central frame just described. The horizontal portion of said guiding frame consists of pairs of parallel, forwardly or longitudinally projecting plate members 54, whose inner ends are united to the transverse bars 51 and 52, as shown in Figs. 8 and 10, and their outer ends are braced together by the bar 55, as shown in Fig. 8. The upright portion of said guiding frame serves essentially as an auxiliary means for bracing the forwardly extending members 54, and consists of four upright bars 49, which are secured at the inner ends of the bars forming the horizontal frame 54, and these upright bars 49 act coöperatively with the inclined brace rods 156, to brace longitudinally the longitudinal extending portion 54 of the guiding frame.

The lower portions of the bars 49 are braced transversely by the bar 50, and the upper portions of the vertical bars 49 are braced transversely by the bar 53, as shown particularly in Fig. 10, thus forming a complete and solid construction, and the entire frame is mounted on the centrally arranged under-carriage frame, previously described, which permits it to swing laterally or horizontally from a plurality of vertically alined pivots 56, 57, 58 and 59, as shown more particularly in Figs. 4 and 10. The uppermost pivot 59 is arranged on the transverse bar 53 and a longitudinal centrally placed link bar 60 pivoted at 61 to the upper portion of the car body 1, as shown in Figs. 4 and 10. The pivot 58 secures the transverse bar 52 of the guiding frame to the top bar 63 of the under-carriage frame. The pivot 57 is arranged in the transverse bar 51 of the guiding frame and in the outer end of the central directing bar 26 by which the under-carriage frame and the guiding frame are effectively supported. The lower pivot 56 is arranged on the transverse bar 50 of the guiding frame and on the lower and longitudinal bar 62 forming part of the under-carriage frame as shown in Figs. 4 and 10.

To permit the front and rear trucks 3 to turn sidewise when the guiding frame is directed laterally, I provide a pair of cross-bars 67, as shown in Figs. 2, 8 and 21, the inner ends of which are pivotally united to one of the trucks 3 by means of its bar 24, the outer ends of which are similarly connected to a bar 68 arranged in plates or brackets 69, see Figs. 8 and 21, on the innermost and longitudinally extending bars 54 of the guiding frame. Owing to this construction it will be seen that when the guiding frame is swung laterally, the frame of the trucks 3 will be also swung laterally; refer to Fig. 2, and as all the trucks of the machine are flexibly connected together by the directing bars 14 and 26, they will readily turn on curves without straining the parts of the mechanism.

For the purpose of supporting the looped portions of the two endless tracks and simultaneously projecting them laterally to the right or left for steering purposes, I provide independently mounted sprocket or drum wheels 46 maintained slidably in the guiding frames previously described, and which are supported either from the car body or bodies, as indicated in Figs. 25, 34, 38, or from the outer trucks 3, shown in Figs. 1, 3, 10, 20 and 39.

The wheels 46 are preferably of polygonal shape and have flat sides corresponding in length to the body rail portions 28 of the track sections. Said flat sides of the wheels 46 are provided with ribs 192, see Figs. 23, 24 arranged to enter the groove or channel of the body portions of the track sections.

The ribs 192 are provided with pairs of sprocket teeth 48 for engagement with the cross bars 41 in the channeled body portions of the track sections.

For the purpose of deflecting the guiding frame laterally and thereby turn or steer the machine, I provide on the lower transverse bar 50 of the guiding frame, see Figs. 2, and 8, a pair of inwardly converging arms 70, at the converging ends of which are united a segmental rack 71 adapted to mesh with a pinion 72, as shown in Figs. 3, 4 and 21.

The pinion 72 is mounted on the lower portion of an upright shaft 73 journaled in bearings in the directing bar 26 and long bottom bar 62, and on the upper portion of the shaft 73 a sprocket wheel is secured as shown in Figs. 4, 20. Another shaft 75 is also journaled in said bars 26 and 62, and is fixed to another sprocket wheel, and both sprocket wheels are connected by a sprocket chain 74. The shaft 75 has its upper portion working in a slot 76 in the bottom of the car body, and on its upper portion is a hand wheel by means of which it may be readily rotated.

In order to allow for the expansion and contraction of the endless tracks when they move on concentric curves, in turning the machine to the right or left, the polygonal drum wheels or sprocket wheels 46 are arranged for any longitudinal sliding movement in the horizontal portions 54 of the guiding frame, and means are provided for forcing said wheels outwardly to take up the slack in the endless tracks.

As illustrated more clearly in Figs. 3, 4, 21, 23, 24, the wheels 46 have their axles mounted in bearings 77 fixed on the side bars 78 of the frame of a carriage arranged for sliding movement between the pair of members 54 of the guiding frame. The side bars 78 have forked ends 79 united by cross-bars 80, and in said forked ends are journaled flanged rollers 81, which are arranged to run in longitudinal slots 82 formed in the sides of the horizontal bars 54 of the guiding frame. For the purpose of actuating these wheeled carriages in the slots 82 and in an outward direction, to place the loop portions of the endless tracks under tension, I preferably provide coiled springs 87 which are set across the rear ends of the guiding frame, as shown in Figs. 1, 3, 8 and 21.

A vertically disposed coiled spring shaft 86 is connected integrally to the horizontal coiled spring 87, and at its lower end it is arranged to branch off so as to form the central axial member 85 which is disposed in the inside of the horizontally disposed coiled spring 87, and the axial member 85 has its end portion bent at right angles to the same as shown at 86², in detail in Figs.

3, 8, 10 and 21. The portion forming the axial member 85 is mounted in bearings on members 83 secured to the frame 54 and to the bars 49 of the guiding frame in order to maintain the parts 85, 86, 86ª and the coiled springs 87 in working position. The end portions of the shafts 86 and 86ª, are connected to cables 84 which pass around guide pulleys 88, and are connected to the outer ends of the side-bars 78 of the wheel-carriages as shown in Figs. 1, 3 and 4. Owing to this construction it will be seen that the coiled springs 87 will tend to actuate the polygonal drum wheels 46 in an outward direction and thereby keep the endless tracks taut, and at the same time the tracks will be allowed to freely expand or contract as the machine is turned. While this is the preferred manner of placing the wheels 46 under tension, it is understood that this may be accomplished by other means and in other ways than that just referred to, see Figs. 25, 38 and 39.

For the purpose of laying down and picking up the track sections, I preferably provide the roller and spring devices 89, 90, 91, 92, 93 and 95 shown in detail in Figs. 3, 4 and 38. One of these devices is provided for each loop portion of each endless track, and each one consists of a flanged roller or wheel 89 journaled on the intermediate portion of a spring 90 adapted to bend or flex in a lateral direction only. The inner end of the spring 90 is slidable and telescopically arranged in a tubular guide 91 pivoted at its center at 92 on one side of the frame of the truck 3. The forward end of the spring 90 is connected to one end of an upwardly inclined spring 93 which is adapted to flex in a vertical plane and which is secured at its other end to the side-bars 78 of the tension device. A coil spring 95 is provided and disposed between the intermediate portion of the spring 90, and the inner end of the last mentioned side-bar 78, suitable telescopically engaged guide rods being preferably arranged within the spring 95 for the purpose of guiding the same, see Fig. 38. Owing to the construction just described, it will be seen that the springs 93, 95, will exert pressure on the spring 90, and hence on the roller 89 which is adapted to guide the track sections as they are laid down or picked up.

The lateral flexing of the spring 90, together with its slidable engagement with its support and guide 91, and the pivotal mounting of the latter, insures the proper laying down and picking up of the track members when the machine is moving on a curve as well as in a straight line.

I may employ any suitable kind of power for propelling the machine, and such power may be applied in any suitable way.

In Fig. 1, I have conventionally illustrated two motors 116 on the car bodies 1 and show them connected by driving belts 117 to the axles of the outer or end trucks 3, as shown also in Figs. 3 and 34.

In Fig. 20 of the drawings, I have shown a single car body 10 mounted on two trucks 3, which latter carry the guiding mechanism and steering apparatus for actuating the loop portions of the endless tracks. It can be noted also that the two endless tracks are supposed to be spaced apart sufficiently to balance the car transversely as this figure does not show resilient wheels standing on the road to balance it transversely. The construction and operation of the other parts, shown in this embodiment of the invention, are the same as those of the corresponding parts in the machine first described. It is therefore assumed that a detailed description of this figure is unnecessary.

In Fig. 22 of the drawings, I have shown two of the combination trucks 5 provided with the centrally arranged longitudinally extending directing bars 14. These bars are disposed in planes at right angles to the truck bolsters 13, and in order to strengthen them, I provide diagonal brace and truss rods 96 between their ends and the bolsters 13. These brace or truss rods on each side of the directing bars 14 are preferably formed from single pieces of metal, suitably bent as shown.

The embodiment of the invention shown in Fig. 25 of the drawings is similar to the one shown in Fig. 1, but differs in that the guiding frame is mounted upon the car body 1ᵇ, and the steering mechanism is arranged on a frame 97ᵇ placed centrally and above the platform of said car body. This embodiment of the invention also shows another form of tension which may be employed for actuating the polygonal drum or sprocket wheel 46ᵇ in an outward direction, to keep the endless tracks under proper tension. The tension device referred to consists of a grooved segment 111 fixed to a rocking shaft 112, said segment having a cord or cable 113 carrying a weight 183ᵇ secured to it. Fixed to the rocking shaft 112 is an arm 115 having a longitudinally slotted portion 114 to receive one end of the shaft 126 of the drum wheel 46ᵇ. It will be noted that the weight 183ᵇ will tend to actuate the slotted end of the arm 115 in an outward direction and thereby cause the endless tracks to be kept under tension. The embodiment of this modified form of the invention applies to a machine provided with two parallel endless tracks or to a machine provided with one centrally disposed endless track as shown by Figs. 34, 35, as the side elevation of a machine carrying one or two endless tracks is practically the same in all particulars.

In Figs. 26, 27, 28, 29 of the drawings, I have shown different forms of track rail sections, which may be made from the blank 37 shown in Fig. 32. These several track rail sections have differently shaped foot portions. Fig. 26 shows a triangular shaped foot 31ª and Fig. 28 a spatula foot member 31ᶜ. Fig. 29 shows circular foot members 31ᵇ, and it is evident that the shape of a foot member is immaterial to the invention, being placed at the end of the diverging wings of a track section, and their body portions instead of being grooved or channeled for the reception of centrally flanged track wheels, are made solid as shown, by placing the two side plate rails against one another and arranged for engagement by grooved track wheels.

The plug member 39, shown in detail in Fig. 33 is also used to bridge over the space between the various forms of track sections.

The embodiment of the invention shown in Fig. 34, of the drawings is similar to the one shown in Fig. 1, but differs in that the upper or return stretches of the endless tracks instead of being carried on the truck wheels are carried overhead on suitable roller-supporting devices. These devices consist of two supporting rollers 98ᴸ journaled on the ends of a longitudinally arranged frame 99ᴸ mounted on a pivot 100ᴸ, which is maintained in a bracket on top of the car body.

In order to balance the roller supporting devices, coiled springs 190 are provided which support the ends of the frame 99ᴸ; and the over-hanging portions of the track on the rollers 98ᴸ are maintained in position by retaining rollers 43ᴸ which are mounted on hangers 44ᴸ pivoted at 42ᴸ on top of brackets 45ᴸ that are secured on the bottom bracket of the roller supporting devices previously described, which rollers 43ᴸ run on the spring rail devices, placed under the main track sections to maintain the main track sections on said rollers 98ᴸ.

It can be seen in Fig. 34, that when the polygonal drum wheel 46ᴸ is of small size in comparison to the vertical dimensions of the car it is necessary to use another kind of roller supporting devices 102ᴸ, 103ᴸ, and 104ᴸ in order to connect the upper stretches of the endless track sections to the lower polygonal sections of the drum-wheel. The last mentioned roller supporting device consists of three rollers 102ᴸ, 103ᴸ, 104ᴸ journaled in consecutive and opposite link bars 105ᴸ, loosely connected to a head 106ᴸ which slide on an inclined standard 107ᴸ. Also arranged on the latter is a coil spring 108 which resiliently supports a collar or slide 109ᴸ, connected by links 110ᴸ to the intermediate portions of the bars 105ᴸ. Owing to this construction it will be seen that the spring 108ᴸ will tend to force the rollers 102ᴸ, 103ᴸ, 104ᴸ, outwardly to resiliently support the track sections. But it is well to note, that the polygonal drum-wheel 46ᴸ may be in practice of a size sufficient to reach the top surface of the car so that the roller supporting devices 102ᴸ, 103ᴸ, 104ᴸ can be dispensed with.

Fig. 34 which is a side elevation at one of the ends of the machine, shows the construction whenever one centrally disposed track is used, or whenever two parallel endless tracks are used in the construction of a machine of this character, consequently Fig. 35, which is a plan view of a centrally disposed endless track and Fig. 36 apply also to the construction shown in Fig. 34. The construction and operation of the other parts of the machine shown in Fig. 34, are similar to the parts of the machine first mentioned, and it is therefore assumed that a detailed description of this figure is unnecessary.

Fig. 35, of the drawings is a top view of one end of the machine which is arranged for a centrally disposed endless track and, Fig. 36 is another view of the same construction. The most salient features of this modification are in the construction of the trucks, having each but two wheels placed in longitudinal alinement with each other to coöperate with the centrally placed sections of the endless track. The construction of these trucks is similar to what has been previously described and comprises, the outer trucks 3ᴸ which support one end of the car by means of the beam 137²ᴸ, and serve also to support the guiding and steering mechanism, when the other end of the car is supported by the combination trucks 5ᴸ by means of the beam 137ᴸ of the car. Each combination truck 5ᴸ consists of a rectangular frame which is mounted in bearing axles 7ᴸ, in the central portions of which are the fixed track wheels 8ᴸ which are in longitudinal alinement with each other. Coiled springs 12ᴸ are on the side-bars of the frame of the truck and support the bolsters 13ᴸ on which are mounted the fifth-wheels 16ᴸ which carry the horizontal connecting frame 6ᴸ. Details of the combination trucks, are in general the same as those which have been previously described. The construction of the front truck 3ᴸ of this machine comprises a rectangular frame on which are mounted in bearings the axles 18ᴸ, each of these axles carrying one fixed track wheel 19ᴸ. On the side-bars of the frame of the truck 3ᴸ are coiled springs supporting the bolster, on which rests the fifth-wheel 27ᴸ which supports the beam 137²ᴸ of the car. The guiding frame consists of but one rectangular frame 54ᴸ strengthened by suitable braces as previously described, and is mounted on a central pivot so as to swing laterally, on the platform of the car, see Figs. 34 and 36.

The embodiment of the invention shown in Figs. 37 and 38 is similar to the construction shown in Figs. 1 and 34, but differs in that the tension device is operated by a weight and that the upper stretches of the two endless tracks are carried overhead on suitable roller supporting devices which have been previously described. The modification in the tension device consists in a weight 183ᵈ hanging from a rope or cable 186ᵈ which passes around a pulley 185 secured near the top of the vertical bars 49ᵈ of the guiding frame, said cable then passes around another pulley 188 held to the upper portion of the guiding frame 47ᵃ, by means of a squarely arranged bracket, and then around a third pulley 88ᵃ, and its end is secured to the outer end of the sliding carriage bar 78. The other parts of the machine are similar to what has been already shown and described.

Fig. 39 is a transverse vertical view of a modified form of the invention. The modifications in this view relate principally to the under carriage frame F, J and R, which is squarely shaped and has the upper stretches of the endless tracks supported on top of the truck wheels, but the tension device is also modified in a manner similar to that which has been described in Fig. 38. The car body is also balanced transversely by the longitudinally disposed springs S supported by the bolster 25ᴮ of the car.

From the foregoing it will be seen that my improved traction engine consists of one or more carriers or cars mounted on a plurality of wheeled trucks, and two separate or independent endless tracks on which the truck wheels run, and it further consists of the mechanism at the ends of the machine for supporting the loop portions of the endless tracks and directing them laterally to the right or left for steering purposes. This construction it will be noted permits the machine to be moved in either direction, in curved as well as straight paths, all of the various parts coöperating to insure a steady even movement of the machine. The peculiar construction of the devices at the ends of the machine for supporting the loop portions of the endless tracks and placing them under tension, permits the various track sections to move longitudinally with respect to each other to adapt the two tracks to curves, and by arranging the truck wheels on one side of the machine so they can slide on their axles insures the engagement of the truck wheels with the tracks irrespective of any slight differences in space between opposite portions. The peculiar construction of the sections or members of the endless tracks, whereby said sections may have longitudinal movement as well as vertical and horizontal or lateral swinging movement, renders the tracks sufficiently flexible to enable the machine to be turned on comparatively short curves without undue strain and without the various parts becoming disarranged in any way. It will be further noted that the overlapping arrangement of the track sections, and the provision of a plurality of wheeled trucks beneath the car bodies insures an even distribution of the weight of the train over the lower stretches of the track and causes the track sections to provide very firm and substantial trackways for the truck wheels. It will be also noted that the cars are balanced transversely by the resilient wheels and this arrangement is used whenever the machine carries one endless track or a pair of endless tracks.

From the foregoing detailed description of the construction and operation of the various parts it is thought that the operation of the entire machine will be readily understood on reference to the drawings, and a further explanation is deemed unnecessary.

While I have shown and described in detail the preferred embodiments of my invention, it is understood, and will be readily apparent to those skilled in the art to which my invention appertains, that the details of construction can be varied in many ways, and modified without departing from the principles of my invention.

In order to make the operation of this mechanism more clear, a brief description of the operation of the various parts of the same is given herewith.

Referring to Fig. 3, the motor 116 supported by the car body 1 suitably actuates the transmission gearing that rotates the wheel 19 directly underneath the same. This wheel in its rotation forces the car and its containing mechanism forwardly or backwardly as the case may be, but assuming that the machine is moving forward, the wheels preceding those just referred to will engage with the track and move thereon, at the same time the wheel 89 together with the various other parts of the device in connection with it, will push the rail in front against the ground and also cause the sprocket wheel or drum to rotate and thereby bring more of the rail sections in contact with the ground, while the sprocket wheel and the other mechanism at the rear end of the machine will raise from off the ground a like amount of rail section. If the carrier in question is provided with a double set of wheels, on its trucks, it will of course necessitate a double set of tracks, and if it has only one centrally arranged set of wheels for the track, only one track will be necessary for the machine. In the latter case, it is preferable to use a pair of comparatively large resilient wheels 139, for the purpose of keeping the machine properly balanced.

By referring to Figs. 5 and 7, it will be noticed how the various trucks provide for the inequalities in the road, and in Figs. 12, 13 and 15, it will be noticed that the tracks are so arranged as to cover a comparatively large area and thereby prevent the rails proper from being improperly disposed, with respect to the truck wheels of the mechanism.

In the double rail systems, the wheels on one side of the truck are more or less loose and thereby take up any inequalities in the same, when the distance between the tracks and rails vary, especially under the conditions that are met with when one machine is moving in a non straight path.

The provision of the mechanism for keeping the sprocket wheels toward the outer ends of the mechanism enables the same to keep the track properly taut all the time and thereby keep the machine arranged for proper operation all the time.

The guiding mechanism disposed at either end of the machine appears so clear from the drawings, particularly in Fig. 21, as to need no further explanation.

Fig. 34 indicates how the rails are guided over-head and kept in proper alinement on the machine.

The arrangement of the connecting means between the various trucks as shown in Fig. 22 permits the same to readily move in any desired direction, and not interfere with the action of the mechanism in any way. With this additional reference, together with that already given in the previous portions of the specifications, it is deemed that a sufficient explanation is given to make the operation of the device clearly apparent to those skilled in the art.

In the modifications various symbols are added to the reference characters given on the first mentioned figures of the mechanism, this is in order to sufficiently distinguish them from those first described and to indicate that they are modifications thereof. In Fig. 36, $^L$ is the symbol used to distinguish various parts of this mechanism, and which are of a similar nature to those referred to in the original description.

The various parts that have their reference characters the same as the original, are provided for a like use. In Fig. 37, $d$ is the distinguishing character added to the original reference characters for the purpose already referred to.

Having thus described my invention, what I claim is:

1. In an apparatus of the class described, the combination of carriers or cars, a plurality of wheels longitudinally arranged with respect to said cars, flexible track sections for said wheels, means for balancing said cars transversely, means for supporting said track sections, resilient means for actuating said supporting means so as to take up the slack in said track sections, and means for picking up and laying down the track as the apparatus advances.

2. In a mechanism of the class described, the combination of carriers or cars having a pair of longitudinally arranged series of wheels, a pair of endless flexible rails for said wheels, means for supporting said rails, resilient means for said last mentioned means so as to keep the same taut and to permit them to expand and contract in a longitudinal direction, and means for supporting and balancing said cars transversely.

3. In a mechanism of the class described, the combination of a pair of parallel flexible endless rails, a carrier having wheeled trucks arranged to travel on said rails, laterally swinging frames at the ends of the mechanism, and wheels resiliently mounted on said swinging frames for supporting the looped portions of the rails and means for balancing said carrier.

4. In a machine of the character described, the combination of a pair of parallel flexibly connected endless rails, laterally swinging frames at the end portions of said machine, longitudinally movable slides in said frames, wheels carried by said slides and engaged with the looped portions of the rails, and means for resiliently forcing said slides outwardly at the end portions of the machine.

5. In a machine of the character described, the combination of endless rails, wheeled carriers arranged to travel on said rails, laterally swinging frames disposed on said carriers and arranged to engage with the looped portions of said rails, longitudinally movable slides on said frames, drum wheels carried by said slides for guiding said rails on said frames and track guiding means controlled by said slides.

6. In a machine of the character described, the combination of endless rails, a wheeled carrier arranged to travel on said rails, means for balancing said carrier, laterally swinging frames at the end portions of the machine, slides upon said frames, polygonal wheels on said slides and engaged with the looped portions of said endless rails, and resilient means for keeping said wheels against said tracks.

7. In a machine of the character described, the combination of endless rails, carriers, wheeled trucks for said carriers engaging with said rails, laterally swinging frames at the end portions of said machine, slotted guide members disposed in said frames, wheeled carriages arranged to travel in said slotted members, polygonal wheels supported by said carriages for engaging with and guiding the looped portion of said rails and means for resiliently forcing said wheels against said rails.

8. In a machine of the class described, the combination of rail sections loosely joined together and arranged to form an endless track, carriers, wheeled trucks for said carriers arranged to travel on said sections, laterally swinging frames at the end of the machine, longitudinally movable slides upon said frames, polygonal wheels carried by said slides and arranged to engage with the looped portions of a track at the ends of the machine, resilient means for actuating said slides, supports arranged to receive said resilient means, connections between said slides and said resilient means and track engaging rollers carried by said means.

9. In a machine of the class described, the combination of flexible endless rails composed of endless channeled sections, said rails being arranged for longitudinal and lateral movement, a carrier having supporting trucks provided with flanged wheels arranged to travel on said rails, guiding frames at the end portions of said machine, slides in said frames, polygonal wheels carried by said slides and provided with flanges and toothed edges arranged to engage in said rails.

10. In a machine of the class described, the combination of endless channeled rails, said rails being arranged to flex in longitudinal and lateral directions, carriers having supporting trucks provided with flanged wheels to travel on said rails, guiding frames having slotted guide members at the end portions of the machine, wheeled carriages arranged to travel in said members, means for actuating said carriages, polygonal wheels mounted on said carriages and arranged to support said rails and engage with the looped portions thereof, flanged rollers arranged to be kept by said means in engagement with said channeled rails.

11. In a machine of the class described, the combination of an endless track, a carrier arranged to engage with said track and to travel thereon, laterally swinging guiding frames at the ends of the machine, means carried by said frames for supporting and guiding the looped portions of the endless track, a gear segment carried at the rear of each frame, an under carriage central frame carried at the front and at the rear of the carriers of the machine, said guiding frame mounted on said under carriage central frame, a steering mechanism for guiding said guiding frame mounted at the rear of said under carriage central frame, said steering mechanism having a pinion provided therein arranged to engage with said gear segment and means for actuating said pinion, a system of rail and spring rail devices arranged to actuate said track.

12. In a machine of the class described, the combination of a pair of parallel channeled rails having their end portions loosely connected and provided with bosses thereon, cars or carriers having a plurality of trucks provided with flanged wheels arranged to travel on said rails, springs on end bars of said trucks, transverse bars secured on top of said springs on each truck, directing bars secured on said transverse bars, loose connections between the consecutive directing bars of the trucks, springs on the side bars of said trucks, bolsters on said last mentioned springs, said bolsters and directing bars being securely fastened to one another and fifth wheels supported coöperatively by said directing bars and bolsters.

13. In a machine of the class described, the combination of parallel channeled flexibly jointed rails, provided with bosses on their end portions, cars or carriers having a plurality of trucks with flanged wheels arranged to travel on said rails, coiled springs on the end bars of said trucks, transverse bars secured to and disposed on said springs, directing bars secured to said transverse bars, loose connections between the consecutive directing bars of said trucks, coiled springs on the side bars of said trucks, bolsters on said last mentioned springs, said bolsters and directing bars being secured integrally and at right angles to one another, fifth wheels supported by said directing bars and bolsters, laterally movable guiding frames at the ends of the machine and drum wheels carried by said frames for actuating said rails.

14. In a machine of the class described, the combination of endless tracks, composed of flexibly connected sections having toes projecting from one end thereof so as to engage with the ground over which the machine travels, a plurality of car bodies, single trucks having relatively small wheels arranged to support the outer end portions of said bodies, inner combination trucks for supporting the inner portions of said bodies, flanged wheels on said trucks arranged to engage with said tracks, resilient means disposed on said trucks, frames disposed on said resilient means, means for guiding said tracks and means for actuating said trucks so that the wheels thereof will move in unison with said tracks, so that they will be kept in engagement therewith and means for balancing said bodies.

15. In a machine of the character set forth, the combination of endless tracks, flexibly connected car bodies, single trucks to support the outer ends of said bodies, inner combination trucks for supporting the inner portions of said bodies, flanged wheels on said trucks to coöperate with said tracks, said inner combination trucks comprising two trucks in longitudinal alinement with each other, fifth-wheels carried by each of said two trucks, bearings secured transversely on the upper members of said fifth-wheels, a longitudinally extending and horizontally placed connecting frame to coöperate with the fifth-wheels of said two trucks, bearings carried near the ends of said connecting frame coöperating with the first mentioned bearings, transverse pivots securing said opposite bearings, a central fifth-wheel mounted in the central portion of said longitudinally extending connecting frame, transversely disposed bearings on the upper member of said central fifth-wheel, a transverse beam secured under said car bodies, a pair of transverse bearings carried by said transverse beam and adapted to coöperate with the above mentioned bearings, a transverse pivot passing through said opposite bearings to secure said car bodies on said combination trucks, an under-carriage-frame secured above said single trucks, laterally swinging frame comprising forwardly and vertically extending portions, pairs of upwardly extending brace-rods at the rear of said swinging frame, inclined brace-rods at the rear of said swinging frame, inclined brace-rods connecting said upwardly extending braces to said swinging frame, a gear segment carried at the inner end of said swinging frame, a steering mechanism for actuating said gear segment of said swinging frame, means upon said swinging frames and engaged with the loop portions of the truck for supporting and yieldably guiding the same, means for balancing each car transversely, said means including longitudinally extending springs secured under the bottom of said car bodies, a transverse axle secured in the middle of the opposite and longitudinally extending springs, rubber tired wheels secured at the end of said transverse axles, said rubber tired wheels coöperating with the surface of the road to balance transversely said cars standing on said endless track, substantially as shown and described.

16. In a machine of the character described, the combination of endless track and cars or carriers having wheeled trucks to travel on said track, means at the ends of the machine for laying down and picking up said track, the upper return stretches of the track being supported and actuated by truck wheels and a roller device acting in combination with an auxiliary rail device placed under the main track section for maintaining the upper return stretches of the track upon said truck wheels, said roller device consisting of brackets rising upwardly and obliquely and secured on the side frame of said trucks, a second bracket rising diagonally from the bolster of said trucks, a transverse pivot engaging the top of the said opposite brackets, a pair of hangers mounted oscillatably on said transverse pivot, rollers mounted on the ends of said pair of hangers to coöperate with said auxiliary rail device to press the return stretches of the track on top of said truck wheels substantially as shown and described.

17. A machine of the class described, comprising in combination a car body, a plurality of trucks for said car body, resilient means disposed on said trucks and interposed between the same and the car body, said resilient means being disposed at the end and central portions of said trucks, the wheels on one side of said trucks being loosely disposed on the axles thereof, endless rails for the truck wheels, said rails being made up of sections loosely connected together and provided with toes at one of the end portions of each section, said toes being arranged to engage with ground over which the machine travels, means for actuating said rails so that the same will be continuously laid in front of said wheels as the machine travels over the road, resilient means for guiding said rails to said last mentioned means and for keeping the rails properly tensioned, a framework for supporting the last mentioned means and provided with a pulley on the front portion thereof, a rope secured to said means and passing over said pulley and means for keeping said rope tensioned and means for guiding said framework and said wheels.

18. In a machine of the class described, a plurality of trucks loosely connected together supporting each carriage, a guiding frame disposed in front of the first and last carriage and guidably secured thereto, sprocket wheels movably mounted in said frames, endless rails mounted on said sprocket wheels and arranged to support the wheels of said trucks so that a suitable roadway will be provided for the same, a spring tension device for keeping said sprockets tensionally applied to said rails and means for balancing said carriages and means disposed between said trucks and said carriages, so that the former can readily oscillate thereon, gears for actuating said frames, means for actuating said gears and resilient means for the returning stretches of said endless rails.

19. In a device of the class described, a combination truck comprising in combination a plurality of sub-trucks, the wheels on one side of said trucks being slidably connected to the axles thereof, resilient means disposed on the journals of said sub-trucks, bars supported by said resilient means, fifth wheels disposed on said bars, a member pivotally secured to the fifth wheels and means secured to the upper portion of the last mentioned member for pivotally holding the lower portion of the car body of the machine.

20. In a machine of the class described, an endless track having a plurality of sections, each of said sections comprising in combination a plurality of side pieces having one of their end portions bent outwardly so as to give a Y-shaped form to said sections, a plurality of blocks disposed on said side pieces and arranged to brace the same transversely together, resilient means disposed in the Y-shaped portions of said sections, bars disposed in said Y-shaped portions and engaging with said resilient means and means connected to said bars and the other end portions of the adjacent sections for movably connecting said sections together.

21. In a machine of the class described, an endless track having a plurality of sections, each of said sections comprising in combination a plurality of side pieces having one of their end portions bent outwardly so as to give a Y-shaped form to said sections, a plurality of blocks disposed on said side pieces and arranged to brace the same transversely together, resilient means disposed in the Y-shaped portions of said sections, bars disposed in said Y-shaped portions and engaging with said resilient means, means connected to said bars and the other end portions of the adjacent sections for movably connecting said sections together and a plug member disposed in the Y-shaped portions of said sections for bracing said sections.

22. In a machine of the class described, an endless track having a plurality of sections, each of said sections comprising in combination a plurality of side pieces having one of their end portions bent outwardly so as to give a Y-shaped form to said sections, toes disposed on said portions arranged to engage with the ground over which the machine travels, a plurality of blocks disposed on said side pieces and arranged to brace the same transversely together, resilient means disposed in the Y-shaped portions of said sections, bars disposed in said Y-shaped portions and engaging with said resilient means, means connected to said bars and the other end portions of the adjacent sections for movably connecting said sections together, a plug member disposed in the Y-shaped portions of said sections for bracing said sections, and means disposed between said sides arranged for engagement with a sprocket wheel or the like for actuating said sections.

In testimony whereof I have signed my name to this specification in the presence of two subscribing witnesses.

PHILIPPE MONTSABRÉ.

Witnesses:
HAZEL COATIE,
D. J. YURKE.